United States Patent
Song

(10) Patent No.: US 9,897,835 B2
(45) Date of Patent: Feb. 20, 2018

(54) DISPLAY APPARATUS

(71) Applicant: Samsung Display Co., Ltd., Yongin, Gyeonggi-Do (KR)

(72) Inventor: Myoung-Hoon Song, Daejeon (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 17 days.

(21) Appl. No.: 14/604,863

(22) Filed: Jan. 26, 2015

(65) Prior Publication Data
US 2015/0293398 A1   Oct. 15, 2015

(30) Foreign Application Priority Data

Apr. 10, 2014   (KR) .................. 10-2014-0043022

(51) Int. Cl.
*G02F 1/1333*   (2006.01)

(52) U.S. Cl.
CPC .............. *G02F 1/133308* (2013.01); *G02F 2001/13332* (2013.01); *G02F 2001/133314* (2013.01); *G02F 2001/133317* (2013.01); *G02F 2001/133322* (2013.01)

(58) Field of Classification Search
CPC ... G02F 1/133308; G02F 2001/133314; G02F 2001/133317; G02F 2001/13332; G02F 2001/133322; G02F 2001/133328
USPC .......................................................... 349/58
See application file for complete search history.

(56) References Cited

U.S. PATENT DOCUMENTS

| | | | |
|---|---|---|---|
| 7,452,121 B2 | 11/2008 | Cho et al. | |
| 8,068,191 B2 | 11/2011 | Choi | |
| 8,350,982 B2 | 1/2013 | Choi et al. | |
| 2003/0035077 A1* | 2/2003 | Lee | G02F 1/133308 349/58 |
| 2007/0046859 A1 | 3/2007 | Huang et al. | |
| 2007/0157487 A1* | 7/2007 | Hyun | G02F 1/133308 36/118.9 |
| 2010/0321605 A1* | 12/2010 | Sakuma | G02F 1/133308 349/58 |
| 2012/0113348 A1* | 5/2012 | Wang | G02F 1/133615 349/58 |
| 2013/0100374 A1* | 4/2013 | Kang | G02B 6/0085 349/58 |
| 2014/0285978 A1* | 9/2014 | Suzuki | H05K 7/14 361/747 |

(Continued)

FOREIGN PATENT DOCUMENTS

| KR | 1020050121006 A | 12/2005 |
|---|---|---|
| KR | 1020080107630 A | 11/2008 |
| KR | 1020100058005 A | 6/2010 |

*Primary Examiner* — Nathanael R Briggs
(74) *Attorney, Agent, or Firm* — Cantor Colburn LLP

(57) ABSTRACT

A display apparatus includes a display panel configured to display an image, a backlight unit which is disposed under the display panel and configured to provide a light to the display panel, a mold frame which surrounds the display panel and the backlight unit, and in which a top cover combining groove and a bottom cover combining groove are defined, a top cover including a top cover protrusion which is protruded from the top cover and received in the top cover combining groove of the mold frame, and a bottom cover on which a bottom cover protrusion is protruded, the bottom cover protrusion being received in the bottom cover combining groove of the mold frame.

18 Claims, 13 Drawing Sheets

(56) References Cited

U.S. PATENT DOCUMENTS

2015/0055368 A1\* 2/2015 Chu ................... G02B 6/0031
362/609

\* cited by examiner

DISPLAY APPARATUS

This application claims priority to Korean Patent Application No. 10-2014-0043022, filed on Apr. 10, 2014, and all the benefits accruing therefrom under 35 U.S.C. § 119, the disclosure of which is incorporated by reference herein in its entirety.

BACKGROUND

1. Field

Exemplary embodiments of the invention relate to a display apparatus.

More particularly, exemplary embodiments of the invention relate to a liquid crystal display apparatus.

2. Description of the Related Art

Recently, a display apparatus having light weight and small size has been manufactured. A cathode ray tube ("CRT") display apparatus has been used due to a performance and a competitive price. However, the CRT display apparatus has a weakness with a size or portability. Therefore, a display apparatus such as a plasma display apparatus, a liquid crystal display ("LCD") apparatus and an organic light emitting display apparatus has been highly regarded due to small size, light weight and low-power-consumption.

In the LCD apparatus, a voltage is applied to change a molecular arrangement of liquid crystal in a liquid crystal cell. The LCD apparatus displays an image using changes of optical property (for example, birefringence, rotatory polarization, dichroism and light scattering) of the liquid crystal cell according to the changes of the molecular arrangement.

The LCD apparatus includes a top chassis, a bottom chassis and a mold frame to receive a display panel and a backlight assembly. Generally, the top chassis and the bottom chassis are combined with a hook connection.

SUMMARY

Assembly and de-assembly of the conventional liquid crystal display ("LCD") may be substantially difficult, so that rework of the structure of the conventional LCD may be substantially difficult.

One or more exemplary embodiment of the invention provides a display apparatus including a receiving container having a simplified structure.

According to an exemplary embodiment of the invention, a display apparatus includes a display panel configured to display an image, a backlight unit which is disposed under the display panel and configured to provide a light to the display panel, a mold frame which surrounds the display panel and the backlight unit, a top cover comprising a top cover protrusion which is protruded from the top cover, and a bottom cover on which a bottom cover protrusion is protruded. A top cover combining groove and a bottom cover combining groove are defined in the mold frame. The top cover protrusion is received in the top cover combining groove of the mold frame. The bottom cover protrusion is received in the bottom cover combining groove of the mold frame.

In an exemplary embodiment, the top cover may further include a top cover upper surface and a top cover lower surface which is opposite to the top cover upper surface. The top cover protrusion of the top cover may be disposed on an outmost portion of the top cover lower surface.

In an exemplary embodiment, the mold frame may include a mold frame upper surface, a mold frame lower surface which is opposite to the mold frame upper surface, a mold frame inner surface which connects the mold frame upper surface and the mold frame lower surface, and a mold frame outer surface which is opposite to the mold frame inner surface. The top cover lower surface of the top cover may contact with the mold frame upper surface of the mold frame. The bottom cover may include a bottom cover upper surface on which a bottom cover protrusion is protruded and a bottom cover lower surface which is opposite to the bottom cover upper surface. The bottom cover upper surface of the bottom cover may contact with the mold frame lower surface of the mold frame.

In an exemplary embodiment, the top cover protrusion may include a first top cover protrusion and a second top cover protrusion which is spaced apart from the first top cover protrusion. The first top cover protrusion may have L-shape corresponding to an edge of the top cover.

In an exemplary embodiment, the mold frame further may include a mold frame inclined surface which connects the mold frame outer surface to the mold frame upper surface. The mold frame inclined surface may be inclined with respect to the mold frame outer surface by a predetermined angle.

In an exemplary embodiment, a weight reduction groove may be defined in the mold frame.

In an exemplary embodiment, the weight reduction groove of the mold frame may have a substantially same shape as that of the top cover combining groove.

In an exemplary embodiment, the top cover combining groove of the mold frame may be spaced apart from the bottom cover combining groove in a plan view.

In an exemplary embodiment, a depth of the top cover combining groove of the mold frame may be greater than about a half of a thickness of the mold frame. A depth of the bottom cover combining groove of the mold frame may be greater than about a half of the thickness of the mold frame.

In an exemplary embodiment, an opening which exposes the backlight unit may be defined through the bottom cover.

In an exemplary embodiment, the bottom cover may include a first bottom cover portion extending in a first direction, a second bottom cover portion spaced apart from the first bottom cover portion in a second direction, which is substantially perpendicular to the first direction, and extending in the first direction, a third bottom cover portion connecting the first bottom cover portion to the second bottom cover portion, and extending in the second direction, and a fourth bottom cover portion connecting the first bottom cover portion to the second bottom cover portion, spaced apart from the third bottom cover portion, and extending in the second direction. The first to fourth bottom cover portions may be physically distinct from each other.

In an exemplary embodiment, the top cover may further include a first top cover portion extending in a first direction, a second top cover portion spaced apart from the first top cover portion in a second direction, which is substantially perpendicular to the first direction, and extending in the first direction, a third top cover portion connecting first top cover portion to the second top cover portion, and extending in the second direction, and a fourth top cover portion connecting the first top cover portion to the second top cover portion, spaced apart from the third top cover portion, and extending in the second direction. The first to fourth top covers may be physically distinct from each other.

In an exemplary embodiment, the top cover protrusion of the top cover may be larger than the top cover combining groove of the mold frame and may be combined with the top cover combining groove of the mold frame in an interference fit manner.

In an exemplary embodiment, a first groove may be defined in the top cover protrusion. A first protrusion of the top cover may be protruded in the top cover combining groove of the mold frame. The first protrusion may be received in the first groove.

In an exemplary embodiment, a side surface of the top cover protrusion may be spaced apart from a side surface of the top cover combining groove by a predetermined distance.

In an exemplary embodiment, the first protrusion may be larger than the first groove and may be combined with the first groove in an interference fit manner.

In an exemplary embodiment, the display apparatus may further include a connecting part electrically connected to the display panel, and a driving part to generate a signal for driving the display panel, and electrically connected to the display panel through the connecting part.

In an exemplary embodiment, a connecting part receiving groove which receives the connecting part may be defined in the mold frame.

In an exemplary embodiment, the display apparatus may further include a driving cover configured to cover the driving part, and where the driving part is disposed between the driving cover and the backlight unit.

According to an exemplary embodiment of the invention, a display apparatus includes a display panel configured to display an image, a backlight unit which is disposed under the display panel and configured to provide a light to the display panel, a first receiving container on which a protrusion is protruded, and a second receiving container in which a receiving groove which receives the protrusion is defined. The first receiving container and the second receiving container are combined with each other by combination of the protrusion and the receiving groove to receive the display panel and the backlight unit.

According to the exemplary embodiments of the invention, a weight reduction groove, a top cover combining groove, and a bottom combining groove are defined in a surface of the mold frame of the display apparatus. The mold frame may be provided by an injection molding method. The weight reduction groove, the top cover combining groove, and the bottom combining groove may be defined when the mold frame is provided. The top cover and the bottom cover include a top cover protrusion and a bottom cover protrusion. The top cover and the bottom cover may be combined with the top cover combining groove and the bottom combining groove of the mold frame, respectively. Accordingly, a receiving container having a simple structure compared with a traditional hook connection, easy to rework, and good for dirt prevention may be provided.

In addition, the first top cover protrusion and the second top cover protrusion are provided at outmost of the top cover lower surface of the top cover, and the first bottom cover protrusions and the second bottom cover protrusion are provided outmost of the bottom cover upper surface, so that damages on the top and bottom covers by external impact may be prevented.

In addition, the top cover and the bottom cover are divided into a plurality portions, so that assembly and disassembly for rework of the display apparatus is easy.

BRIEF DESCRIPTION OF THE DRAWINGS

The above and other features of the invention will become more apparent by describing in detail exemplary embodiments thereof with reference to the accompanying drawings, in which.

DETAILED DESCRIPTION

Figure 1:
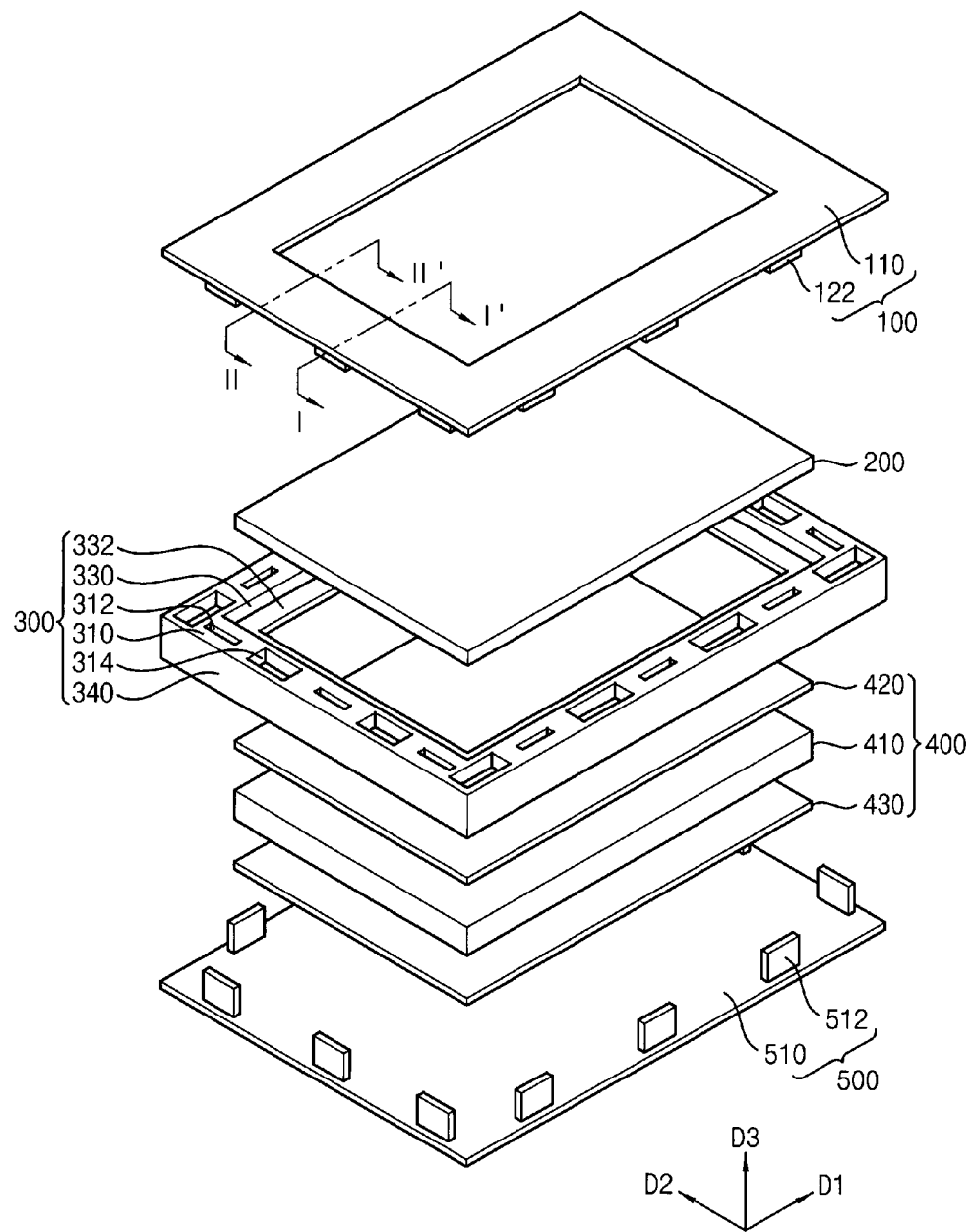
FIG. 1 is an exploded perspective view illustrating an exemplary embodiment of a display apparatus according to the invention.

Hereinafter, the invention will be explained in detail with reference to the accompanying drawings.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. In an exemplary embodiment, when the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 2:
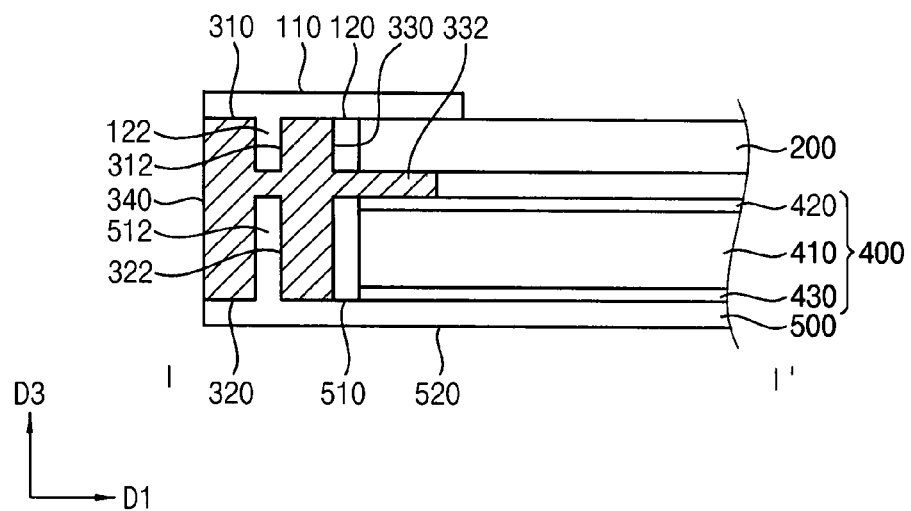
FIG. 2 is a cross-sectional view taken along line I-I' of FIG. 1.
Figure 3:
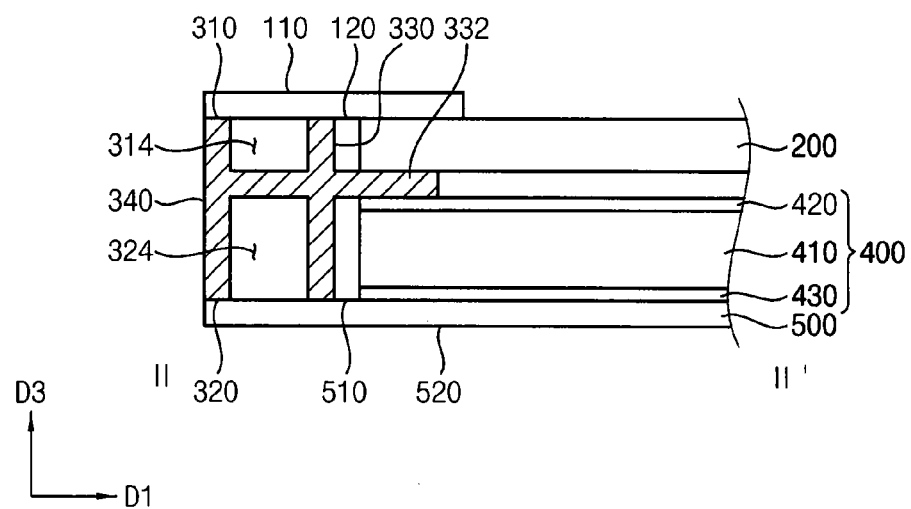
FIG. 3 is a cross-sectional view taken along line II-II' of FIG. 1.

FIG. 1 is an exploded perspective view illustrating a display apparatus according to an exemplary embodiment of the invention. FIG. 2 is a cross-sectional view taken along line I-I' of FIG. 1. FIG. 3 is a cross-sectional view taken along line II-II' of FIG. 1.

Referring to FIGS. 1 to 3, a display apparatus includes a receiving container, a display panel 200 and a backlight unit 400. The receiving container includes a top cover 100, a bottom cover 500 and a mold frame 300. The receiving container receives the display panel 200 and the backlight unit 400.

The top cover 100 extends in a first direction D1 and a second direction D2 which is perpendicular to the first direction D1. An opening is defined at a central portion of the top cover 100. The top cover 100 includes a top cover upper surface 110 and a top cover lower surface 120 which is opposite to the top cover upper surface 110. A top cover protrusion 122 is provided on the top cover lower surface 120. Thus, the top cover protrusion 122 extends in a third direction D3. The third direction D3 is substantially perpendicular to the first and second directions D1 and D2. The top cover protrusion 122 may be received in a top cover combining groove of the mold frame 300, which will be mentioned later, to combine the top cover 100 and the mold frame 300 with each other.

In an exemplary embodiment, the top cover 100 may include a material having good impact resistance, such as plastic. In an exemplary embodiment, the top cover 100 may include polycarbonate and glass fiber, for example. In an exemplary embodiment, the top cover 100 may include a material same as that of the mold frame 300, for example. In an exemplary embodiment, the top cover 100 may be provided by an injection molding method, for example.

The display panel 200 is received between the mold frame 300 and the top cover 100.

The display panel 200 displays an image using light generated from the backlight unit 400 according to driving and data signal applied from outside. The display panel 200 includes an array substrate, an opposite substrate and a liquid crystal layer disposed between the array substrate and the opposite substrate.

In an exemplary embodiment, the display panel 200 may be connected to an additional ground member. In the exemplary embodiment, a ground member (not shown) may be disposed between the display panel 200 and a mold frame inner surface of the mold frame 300, for example, which will be mentioned later.

The array substrate may include a plurality of gate lines, a plurality of data lines crossing the gate lines, and a plurality of switching element connected to the gate and data lines. In an exemplary embodiment, the opposite substrate may include a black matrix blocking light and a color filter having a color. Although the opposite substrate includes the color filter in the exemplary embodiment, the invention is not limited thereto, and the color filter may be provided in the array substrate. In an exemplary embodiment, the liquid crystal layer is disposed between the array substrate and the opposite substrate. In an exemplary embodiment, the liquid crystal layer includes liquid crystal molecules having optically anisotropic. In an exemplary embodiment, the liquid crystal molecules are driven by electric field, so that light may pass through or be blocked by the liquid crystal layer to display an image. In an exemplary embodiment, the display panel 200 may further include an upper polarizer disposed on the display panel 200 and a lower polarizer disposed under the display panel 200.

The mold frame 300 is disposed between the top cover 100 and the bottom cover 500. The mold frame 300 receives and protects the display panel 200 and the backlight unit 400.

The mold frame 300 extends in the first direction D1 and the second direction D2. An opening is defined in the middle of the mold frame 300, so that light generated from the backlight unit 400 may reach to the display panel 200.

The mold frame 300 includes a mold frame upper surface 310, a mold frame lower surface 320 which is opposite to the mold frame upper surface 310, a mold frame inner surface 330 which connects the mold frame upper surface 310 and the mold frame lower surface 320 and defines the opening, and a mold frame outer surface 340 which is opposite to the mold frame inner surface 330 and exposed to outside of the display apparatus. Thus, the mold frame 300 surrounds the display panel 200 and the backlight unit 400.

A top cover combining groove 312 and a weight reduction groove 314 are defined in the mold frame upper surface 310. The top cover combining groove 312 receives the top cover protrusion 122 of the top cover 100, so that the top cover 100 and the mold frame 300 may be combined together. In an exemplary embodiment, the top cover protrusion 122 and the top cover combining groove 312 may be combined with each other in interference fit manner. Thus, the top cover protrusion 122 may be slightly larger than the top cover combining groove 312. Accordingly, the top cover 100 and the mold frame 300 may be firmly combined together.

The weight reduction groove 314 may lower a weight of the mold frame 300, and may reinforce strength of a structure. In an exemplary embodiment, the weight reduction groove 314 may be defined in the mold frame lower surface 320, the mold frame inner surface 330 and the mold frame outer surface 340, as well as in the mold frame upper surface 310.

The mold frame upper surface 310 makes contact with the top cover lower surface 120 of the top cover 100. In an exemplary embodiment, a boundary shape of the mold frame 300 in a plan view may be substantially same as that of the top cover 100.

A bottom cover combining groove 322 and a weight reduction groove 324 may be defined in the mold frame lower surface 320. The bottom cover combining groove 322 receives the bottom cover protrusion 512 of the bottom cover 500, so that the bottom cover 500 and the mold frame 300 may be combined together. The bottom cover protrusion 512 and the bottom cover combining groove 322 may be combined with each other in interference fit manner. Thus, the bottom cover protrusion 512 may be slightly larger than the bottom cover combining groove 322. Accordingly, the bottom cover 500 and the mold frame 300 may be firmly combined together.

The mold frame lower surface 320 makes contact with a bottom cover upper surface of the bottom cover 500, which will be mentioned later. In an exemplary embodiment, a boundary shape of the mold frame 300 in a plan view may be substantially same as that of the bottom cover 500.

A display panel supporting portion 332 is protruded from the mold frame inner surface 330. The display panel supporting portion 332 may support the display panel 200 to receive the display panel 200 in the receiving container. Thus, the display panel 200 may be disposed between the display panel supporting portion 332 and the top cover 100, and be received in the receiving container.

In an exemplary embodiment, the backlight unit 400 may be disposed between the display panel supporting portion 332 and the bottom cover 500, and be received in the receiving container. Thus, the display panel supporting portion 332 is disposed between the display panel 200 and the backlight unit 400, so that the display panel 200 may be separated from the backlight unit 400 by a predetermined distance.

In an exemplary embodiment, the mold frame 300 may include a material having good impact resistance, such as plastic. In an exemplary embodiment, the mold frame 300 may include polycarbonate or glass fiber, for example. In an exemplary embodiment, the mold frame 300 may be provided by an injection molding method, for example.

The backlight unit 400 is disposed under the display panel 200 to supply a light to the display panel 200.

The backlight unit 400 includes a light guiding plate 410, an optical element 420, a reflecting plate 430 and a light source (not shown).

The light guiding plate 410 is disposed under the display panel 200. The light guiding plate 410 guides the light from the light source to the display panel 200. The light guiding plate 410 converts incident light having a light distribution of the spot light source or the line light source to exiting light having a light distribution of a surface light source. Thus, the light guiding plate 410 guides the light from the light source toward the display panel 200. Although the light guiding plate 410 is described having uniform thickness in the illustrated exemplary embodiment, the invention is not limited thereto, and the light guiding plate 41 may have various shapes. In an exemplary embodiment, the light guiding plate 410 may have a wedge shaped cross section, for example. In an exemplary embodiment, a thickness of the light guiding plate 410 may be smaller as far from the light source to provide the wedge shaped cross section.

The optical element 420 is disposed on the light guiding plate 410. The optical element 420 may improve optical property of the light from the light guiding plate 410. Thus, the optical element 420 may provide uniform brightness of the light from the light guiding plate 410. In an exemplary embodiment, the optical element 420 may include plurality of optical sheets. In the exemplary embodiment, optical element 420 may include a protecting sheet, a prism sheet and a diffusion sheet, for example. In an exemplary embodiment, the diffusion sheet may be disposed on a light exiting surface of the light guiding plate 410. In an exemplary embodiment, the prism sheet may be disposed on the diffusion sheet. In an exemplary embodiment, the protecting sheet may be disposed on the prism sheet. In an exemplary embodiment, the prism sheet may include an upper prism sheet and a lower prism sheet. In an exemplary embodiment, an axis of the upper prism sheet may be substantially perpendicular to an axis of the lower prism sheet. Although the optical element 420 is described including the protecting sheet, the invention is not limited thereto, and the prism sheet and the diffusion sheet, various other modifications of the optical sheet may be possible.

The light source generates light to provide the light to the light guiding plate 410. The light source may be disposed adjacent to a side surface of the light guiding plate 410. In an exemplary embodiment, the light source may include a plurality of light emitting diode ("LED") light sources, and may be a spot light source or a line light source generating the light.

The reflecting plate 430 is disposed under the light guiding plate 410. Thus, the reflecting plate 430 is disposed between the light guiding plate 410 and the bottom cover 500. The reflecting plate 430 reflects light from a bottom surface of the light guiding plate 410 which is opposite to the light exiting surface of the light guiding plate 410 toward the display panel 200, so that luminous efficiency may be improved.

The bottom cover 500 is disposed under the mold frame 300. The bottom cover 500 may be combined with the mold frame 300 to receive the backlight unit 400.

The bottom cover 500 includes a bottom cover upper surface 510 and a bottom cover lower surface 520 which is opposite to the bottom cover upper surface 510. A bottom cover protrusion 512 is provided on the bottom cover upper surface 510. Thus, the bottom cover protrusion 512 extends in the third direction D3. The bottom cover protrusion 512 is received in the bottom cover combining groove 322 of the mold frame 300, so that the bottom cover 500 and the mold frame 300 may be combined with each other.

In an exemplary embodiment, the bottom cover 500 may include a material having good impact resistance, such as plastic. In an exemplary embodiment, the bottom cover 500 may include polycarbonate and glass fiber, for example. In an exemplary embodiment, the bottom cover 500 may include a substantially same material as that of the mold frame 300. Thus, the top cover 100, the mold frame 300 and the bottom cover 500 may include substantially same material. In an exemplary embodiment, the bottom cover 500 may be provided by an injection molding method, for example.

According to the exemplary embodiment, a weight reduction groove, a top cover combining groove, and a bottom combining groove are defined in a surface of the mold frame of the display apparatus. In an exemplary embodiment, the mold frame may be provided by an injection molding method. The weight reduction groove, the top cover combining groove, and the bottom combining groove may be defined when the mold frame is provided. The top cover and the bottom cover include a top cover protrusion and a bottom cover protrusion. The top cover and the bottom cover may be combined with the top cover combining groove and the bottom combining groove of the mold frame, respectively. Accordingly, a receiving container having a simple structure compared with a traditional structure such as a hook connection, may be easy to rework, and good for dirt prevention.

Figure 4:
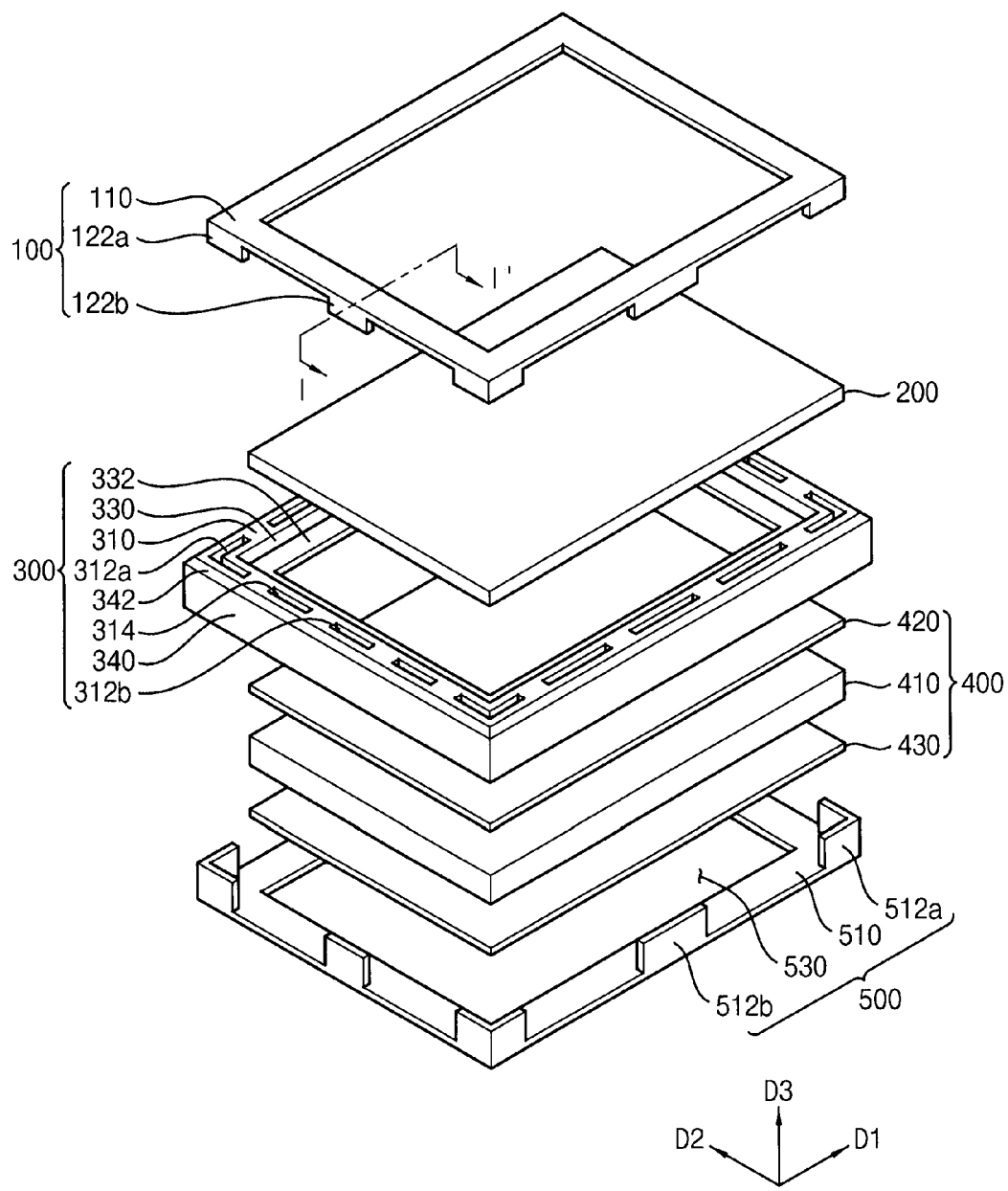
FIG. 4 is an exploded perspective view illustrating an exemplary embodiment of a display apparatus according to the invention.
Figure 5:
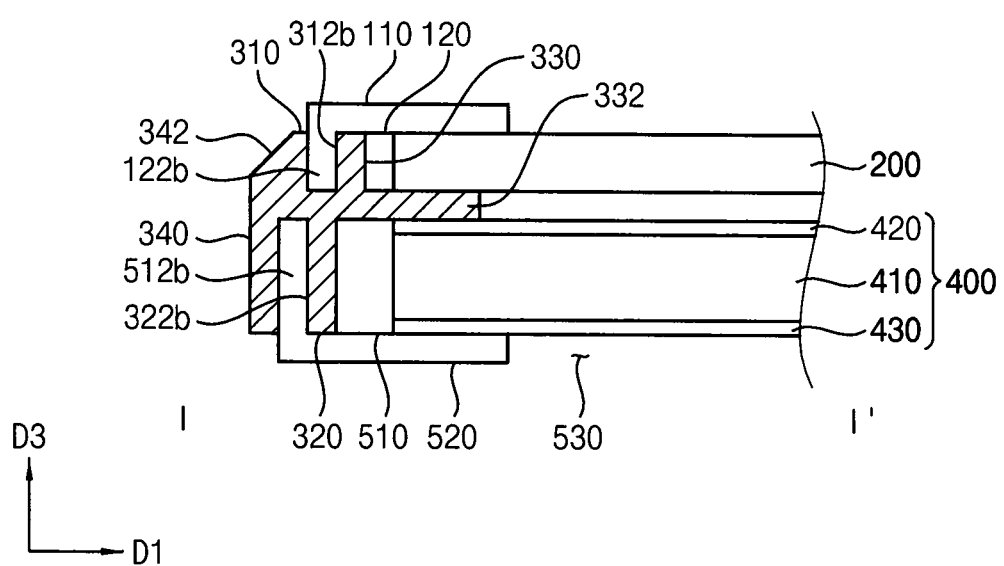
FIG. 5 is a cross-sectional view taken along line I-I' of FIG. 4.

FIG. 4 is an exploded perspective view illustrating a display apparatus according to an exemplary embodiment of the invention. FIG. 5 is a cross-sectional view taken along line I-I' of FIG. 4.

Referring to FIGS. 4 and 5, a display apparatus is substantially same as a display apparatus of FIGS. 1 to 3, except for a receiving container. Thus, any further detailed descriptions concerning the same elements will be briefly described or omitted.

The display apparatus includes a receiving container, a display panel 200 and a backlight unit 400. The receiving container includes a top cover 100, a bottom cover 500 and a mold frame 300. The receiving container receives the display panel 200 and the backlight unit 400.

The top cover 100 extends in a first direction D1 and a second direction D2. An opening is defined at a central portion of the top cover 100. The top cover 100 includes a top cover upper surface 110 and a top cover lower surface 120 which is opposite to the top cover upper surface 110. A first top cover protrusion 122a and a second top cover protrusion 122b are provided on the top cover lower surface 120. Thus, the first top cover protrusion 122a and the second top cover protrusion 122b extend in a third direction D3. The third direction D3 is substantially perpendicular to the first and second directions D1 and D2. The first top cover protrusion 122a and the second top cover protrusion 122b may be respectively received in first and second top cover combining grooves of the mold frame 300, which will be mentioned later, to combine the top cover 100 and the mold frame 300 with each other.

The first top cover protrusion 122a is provided at an edge of the top cover 100, and may have L-shape corresponding to the edge of the top cover 100 in a plan view. The first top cover protrusion 122a is disposed on an outmost portion of the top cover lower surface 120 of the top cover 100, so that a side surface of the first top cover protrusion 122a may be in a same plane as a side surface of the top cover 100.

The second top cover protrusion 122b is disposed on an outmost portion of the top cover lower surface 120 of the top cover 100, so that a side surface of the second top cover protrusion 122b may be in a same plane as a side surface of the top cover 100.

Accordingly, the first and second top cover protrusion 122a and 122b are provided at outmost of the top cover lower surface 120 of the top cover 100, so that damages on edges of the top cover when the display apparatus is assembled may be prevented.

In an exemplary embodiment, the top cover 100 may include a material having good impact resistance, such as plastic. In an exemplary embodiment, the top cover 100 may include polycarbonate and glass fiber, for example. In an exemplary embodiment, the top cover 100 may include a material same as that of the mold frame 300. In an exemplary embodiment, the top cover 100 may be provided by an injection molding method, for example.

The display panel 200 is received between the mold frame 300 and the top cover 100.

The display panel 200 displays an image using light generated from the backlight unit 400 according to driving and data signal applied from outside. The display panel 200 includes an array substrate, an opposite substrate and a liquid crystal layer disposed between the array substrate and the opposite substrate.

The mold frame 300 is disposed between the top cover 100 and the bottom cover 500. The mold frame 300 receives and protects the display panel 200 and the backlight unit 400.

The mold frame 300 extends in the first direction D1 and the second direction D2. An opening is defined in the middle of the mold frame 300, so that light generated from the backlight unit 400 may reach to the display panel 200.

The mold frame 300 includes a mold frame upper surface 310, a mold frame lower surface 320 which is opposite to the mold frame upper surface 310, a mold frame inner surface 330 which connects the mold frame upper surface 310 and the mold frame lower surface 320 and defines the opening, a mold frame outer surface 340 which is opposite to the mold frame inner surface 330 and exposed to outside of the display apparatus, and a mold frame inclined surface 342 which connects the mold frame outer surface 340 to the mold frame upper surface 310. Thus, the mold frame 300 surrounds the display panel 200 and the backlight unit 400. A display panel supporting portion 332 is protruded from the mold frame inner surface 330.

A first top cover combining groove 312a, a second top cover combining groove 312b and a weight reduction groove 314 are defined in the mold frame upper surface 310.

The first top cover combining groove 312a receives the first top cover protrusion 122a of the top cover 100, so that the top cover 100 and the mold frame 300 may be combined together. In an exemplary embodiment, the first top cover combining groove 312a may have L-shape corresponding to the first top cover protrusion 122a in a plan view. The second top cover combining groove 312b receives the second top cover protrusion 122b of the top cover 100, so that the top cover 100 and the mold frame 300 may be combined together. In an exemplary embodiment, the first top cover protrusion 122a and the first top cover combining groove 312a may be combined with each other in interference fit manner. In an exemplary embodiment, the second top cover protrusion 122b and the second top cover combining groove 312b may be combined with each other in interference fit manner. Thus, the first and second top cover protrusions 122a and 122b may be slightly larger than the first and second top cover combining grooves 312a and 312b, respectively. Accordingly, the top cover 100 and the mold frame 300 may be firmly combined together.

The weight reduction groove 314 may lower a weight of the mold frame 300 and may reinforce strength of a structure. In an exemplary embodiment, the weight reduction groove 314 may be defined in the mold frame lower surface 320, the mold frame inner surface 330 and the mold frame outer surface 340, as well as in the mold frame upper surface 310. The weight reduction groove 314 may have a shape substantially same as the second top cover combining groove 312b.

The mold frame inclined surface 342 connects the mold frame upper surface 310 with the mold frame outer surface 340, and makes a predetermined angle with the mold frame outer surface 340.

Accordingly, the mold frame outer surface 340 is larger than the top cover 100 in a plan view. Thus, damages on the top cover 100 by external impact on a side of the display apparatus may be prevented.

A first bottom cover combining groove (not shown), a second bottom cover combining groove 322b and a weight reduction groove may be defined in the mold frame lower surface 320. The first bottom cover combining groove receives a first bottom cover protrusion 512a of the bottom cover 500, which will be mentioned later, so that the bottom cover 500 and the mold frame 300 may be combined together. In an exemplary embodiment, the first bottom cover combining groove may have L-shape corresponding to the first bottom cover protrusion 512a in a plan view. The second bottom cover combining groove 322b receives a second bottom cover protrusion 512b of the bottom cover 500, which will be mentioned later, so that the bottom cover 500 and the mold frame 300 may be combined together. The first bottom cover protrusion 512a and the first bottom cover combining groove may be combined with each other in interference fit manner. The second bottom cover protrusion 512b and the second bottom cover combining groove 322b may be combined with each other in interference fit manner. Thus, the first and second bottom cover protrusions 512a and 512b may be slightly larger than the first bottom cover combining groove and second bottom cover combining groove 322b, respectively. Accordingly, the bottom cover 500 and the mold frame 300 may be firmly combined together.

The weight reduction groove defined in the mold frame lower surface 320 may have a shape substantially same as the second bottom cover combining groove 322b.

The mold frame outer surface 340 is larger than the bottom cover 500 in a plan view. Thus, damages on the bottom cover 500 by external impact on a side of the display apparatus may be prevented.

In an exemplary embodiment, the mold frame 300 may include a material having good impact resistance, such as plastic. In an exemplary embodiment, the mold frame 300 may include polycarbonate and glass fiber, for example. In an exemplary embodiment, the mold frame 300 may be provided by an injection molding method, for example.

The backlight unit 400 is disposed under the display panel 200 to supply a light to the display panel 200.

The backlight unit 400 includes a light guiding plate 410, an optical element 420, a reflecting plate 430 and a light source (not shown).

The bottom cover 500 is disposed under the mold frame 300. The bottom cover 500 may be combined with the mold frame 300 to receive the backlight unit 400.

The bottom cover 500 extends in the first direction D1 and the second direction D2. An opening 530 exposing the reflecting plate 430 is defined at the middle of the bottom cover 500.

The bottom cover 500 includes a bottom cover upper surface 510 and a bottom cover lower surface 520 which is opposite to the bottom cover upper surface 510. A first bottom cover protrusion 512a and a second bottom cover protrusion 512b are provided on the bottom cover upper surface 510. Thus, the first and second bottom cover protrusions 512a and 512b extend in the third direction D3. The first and second bottom cover protrusions 512a and 512b are received in the first bottom cover combining groove and the second bottom cover combining groove 322b of the mold frame 300, respectively, so that the bottom cover 500 and the mold frame 300 may be combined with each other.

The first bottom cover protrusions 512a is provided at an edge of the bottom cover 500, and may have L-shape corresponding to the edge of the bottom cover 500 in a plan view. The first bottom cover protrusions 512a is disposed on an outmost portion of the bottom cover upper surface 510 of the bottom cover 500, so that a side surface of the first bottom cover protrusions 512a may be in a same plane as a side surface of the bottom cover 500.

The second bottom cover protrusion 512b is disposed on an outmost portion of the bottom cover upper surface 510 of the bottom cover 500, so that a side surface of the second bottom cover protrusion 512b may be in a same plane as a side surface of the bottom cover 500.

Accordingly, the first and second bottom cover protrusions 512a and 512b are provided at outmost of the bottom cover upper surface 510 of the bottom cover 500, so that damages on edges of the bottom cover of the display apparatus, which is generated during an assembly process, may be prevented.

In an exemplary embodiment, the bottom cover 500 may include a material having good impact resistance, such as plastic. In an exemplary embodiment, the bottom cover 500 may include polycarbonate and glass fiber, for example. In an exemplary embodiment, the bottom cover 500 may include a material same as that of the mold frame 300. Thus, the top cover 100, the mold frame 300 and the bottom cover 500 may include the same material. In an exemplary embodiment, the bottom cover 500 may be provided by an injection molding method, for example.

According to the exemplary embodiment, the first and second top cover protrusion 122a and 122b are provided at outmost of the top cover lower surface 120 of the top cover 100, and the first and second bottom cover protrusions 512a and 512b are provided at outmost of the bottom cover upper surface 510 of the bottom cover 500, so that damages on the top and bottom covers by external impact may be prevented.

Figure 6:
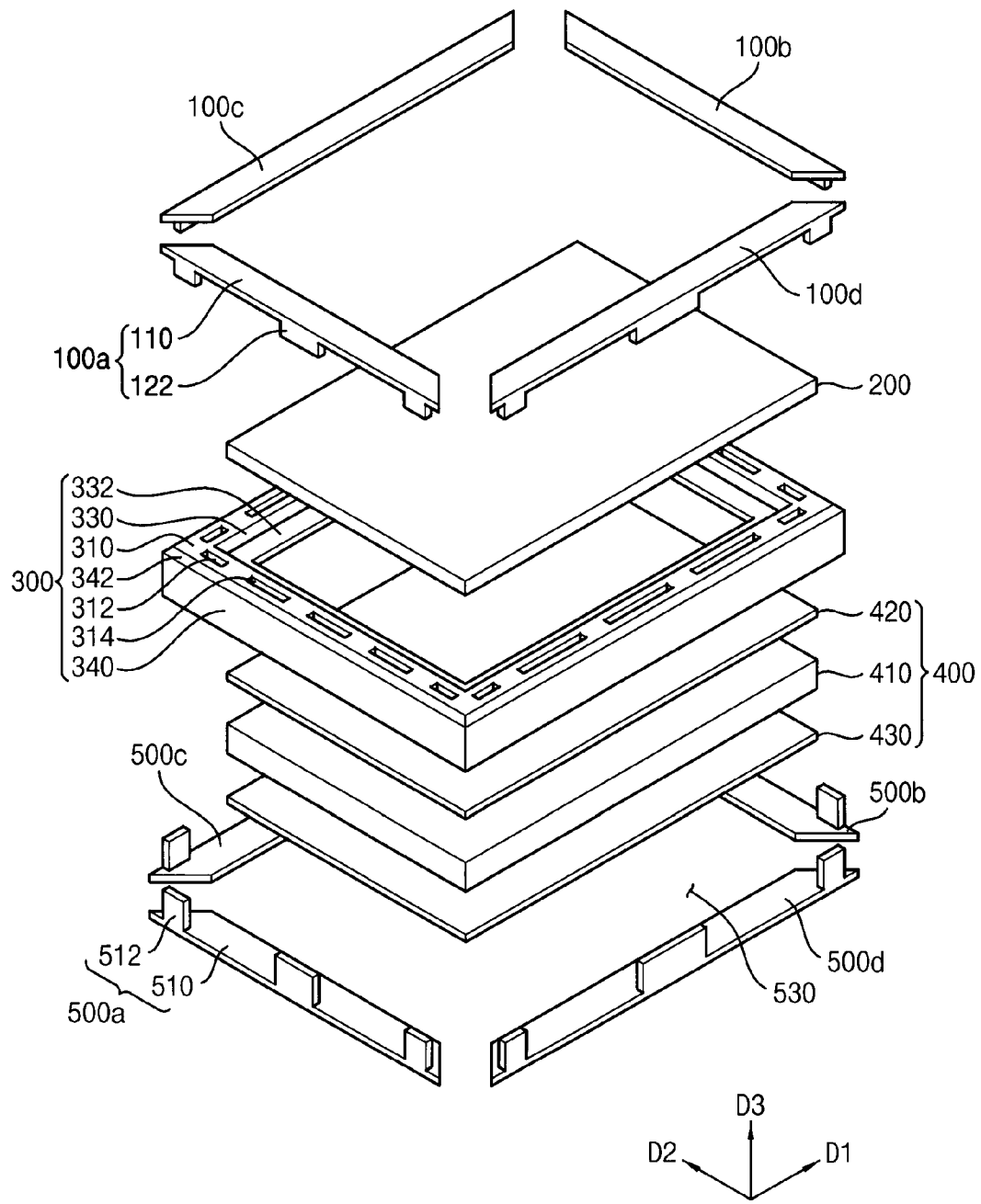
FIG. 6 is an exploded perspective view illustrating an exemplary embodiment of a display apparatus according to the invention.

FIG. 6 is an exploded perspective view illustrating a display apparatus according to an exemplary embodiment of the invention.

Referring to FIG. 6, a display apparatus is substantially same as a display apparatus of FIGS. 4 to 5, except for a receiving container. Thus, any further detailed descriptions concerning the same elements will be briefly described or omitted.

The display apparatus includes a receiving container, a display panel 200 and a backlight unit 400. The receiving container includes a top cover, a bottom cover and a mold frame 300. The receiving container receives the display panel 200 and the backlight unit 400.

The top cover includes a first top cover portion 100a, a second top cover portion 100b, a third top cover portion 100c and a fourth top cover portion 100d. The top cover is substantially same as a top cover of FIG. 4, except that the top cover is divided into the first to fourth top cover portions.

The first top cover portion 100a extends in a second direction D2 which is substantially perpendicular to a first direction D1. The first top cover portion 100a includes a first top cover upper surface 110 and a first top cover lower surface which is opposite to the first top cover upper surface 110. A top cover protrusion 122 is provided on the first top cover lower surface. Thus, the top cover protrusion 122 extends in a third direction D3. The third direction D3 is substantially perpendicular to the first and second directions D1 and D2.

The second top cover portion 100b is spaced apart from the first top cover portion 100a in the first direction D1, and extends in the second direction D2. The second top cover portion 100b includes a second top cover upper surface and a second top cover lower surface which is opposite to the second top cover upper surface. A top cover protrusion is provided on the second top cover lower surface.

The third top cover portion 100c extends in the first direction D1, and is connected with the first top cover portion 100a and the second top cover portion 100b. The third top cover portion 100c includes a third top cover upper surface and a third top cover lower surface which is opposite to the third top cover upper surface. A top cover protrusion is provided on the third top cover lower surface.

The fourth top cover portion 100d is spaced apart from the third top cover portion 100c in the second direction D2, and extends in the first direction D1. The fourth top cover portion 100d includes a fourth top cover upper surface and a fourth top cover lower surface which is opposite to the fourth top cover upper surface. A top cover protrusion is provided on the fourth top cover lower surface.

In an exemplary embodiment, the first to fourth top cover portions 100a, 100b, 100c and 100d may include a material having good impact resistance, such as plastic. In an exemplary embodiment, the first to fourth top cover portions 100a, 100b, 100c and 100d may include polycarbonate and glass fiber, for example. In an exemplary embodiment, the first to fourth top cover portions 100a, 100b, 100c and 100d may include a material same as that of the mold frame 300. In an exemplary embodiment, the first to fourth top cover portions 100a, 100b, 100c and 100d may be provided by an injection molding method, for example.

The display panel 200 is received in between the mold frame 300 and the top cover 100.

The display panel 200 displays an image using light generated from the backlight unit 400 according to driving and data signal applied from outside. The display panel 200 includes an array substrate, an opposite substrate and a liquid crystal layer disposed between the array substrate and the opposite substrate.

The mold frame 300 is disposed between the top cover 100 and the bottom cover 500. The mold frame 300 receives and protects the display panel 200 and the backlight unit 400.

The mold frame 300 extends in the first direction D1 and the second direction D2. An opening is defined in the middle of the mold frame 300, so that light generated from the backlight unit 400 may reach to the display panel 200.

The mold frame 300 includes a mold frame upper surface 310, a mold frame lower surface 320 which is opposite to the mold frame upper surface 310, a mold frame inner surface 330 which connects the mold frame upper surface 310 and the mold frame lower surface 320 and defines the opening, a mold frame outer surface 340 which is opposite to the mold frame inner surface 330 and exposed to outside of the display apparatus, and a mold frame inclined surface 342 which connects the mold frame outer surface 340 to the mold frame upper surface 310. Thus, the mold frame 300 surrounds the display panel 200 and the backlight unit 400. A display panel supporting portion 332 is protruded from the mold frame inner surface 330.

A plurality of top cover combining groove 312 and a weight reduction groove 314 are defined in the mold frame upper surface 310. The top cover combining grooves 312 receive the top cover protrusions 122 of the first to fourth top covers 100a, 100b, 100c and 100d, so that the first to fourth top covers 100a, 100b, 100c and 100d may be combined with the mold frame 300. In an exemplary embodiment, the top cover protrusion 122 and the top cover combining groove 312 may be combined with each other in interference fit manner.

A plurality of bottom cover combining grooves and a weight reduction groove are defined in the mold frame lower surface 320.

The bottom cover combining grooves receive bottom cover protrusions of the first to fourth bottom cover portions, which will be mentioned later, so that the first to fourth bottom cover portions and the mold frame 300 may be combined together. In an exemplary embodiment, the bottom cover protrusion and the bottom cover combining groove may be combined with each other in interference fit manner.

In an exemplary embodiment, the mold frame 300 may include a material having good impact resistance, such as plastic. In an exemplary embodiment, the mold frame 300 may include polycarbonate and glass fiber, for example. In an exemplary embodiment, the mold frame 300 may be provided by an injection molding method, for example.

The backlight unit 400 is disposed under the display panel 200 to supply a light to the display panel 200.

The backlight unit 400 includes a light guiding plate 410, an optical element 420, a reflecting plate 430 and a light source (not shown).

The bottom cover includes a first bottom cover portion 500a, a second bottom cover portion 500b, a third bottom cover portion 500c and a fourth bottom cover portion 500d.

The first bottom cover portion 500a extends in the second direction D2. The first bottom cover portion 500a includes a first bottom cover upper surface 510a and a first bottom cover lower surface 520a which is opposite to the first bottom cover upper surface 510. A bottom cover protrusion 512 is provided on the first bottom cover upper surface 510. Thus, the bottom cover protrusion 512 extends in the third direction D3.

The second bottom cover portion 500b is spaced apart from the first bottom cover portion 500a in the first direction D1, and extends in the second direction D2. The second bottom cover portion 500b includes a second bottom cover upper surface and a second bottom cover lower surface which is opposite to the second bottom cover upper surface. A bottom cover protrusion is provided on the second bottom cover upper surface.

The third bottom cover portion 500c extends in the first direction D1, and is connected with the first bottom cover portion 500a and the second bottom cover portion 500b. The third bottom cover portion 500c includes a third bottom cover upper surface and a third bottom cover lower surface which is opposite to the third bottom cover upper surface. A bottom cover protrusion is provided on the third bottom cover upper surface.

The fourth bottom cover portion 500d is spaced apart from the third bottom cover portion 500c in the second direction D2, and extends in the first direction D1. The fourth bottom cover portion 500d includes a fourth bottom cover upper surface and a fourth bottom cover lower surface which is opposite to the fourth bottom cover upper surface. A bottom cover protrusion is provided on the fourth bottom cover upper surface.

In an exemplary embodiment, the first to fourth bottom cover portions 500a to 500d may include a material having good impact resistance, such as plastic. In an exemplary embodiment, the first to fourth bottom cover portions 500a to 500d may include polycarbonate and glass fiber, for example. In an exemplary embodiment, the first to fourth bottom cover portions 500a to 500d may include a material same as that of the mold frame 300, for example. Thus, the first to fourth top cover portions 100a to 100d, the mold frame 300 and the first to fourth bottom cover portions 500a to 500d may include same material. In an exemplary embodiment, the first to fourth bottom cover portions 500a to 500d may be provided by an injection molding method, for example.

According to the exemplary embodiment, the top cover and the bottom cover are divided into a plurality portions, so that assembly and disassembly for rework of the display apparatus is easy.

Figure 7:
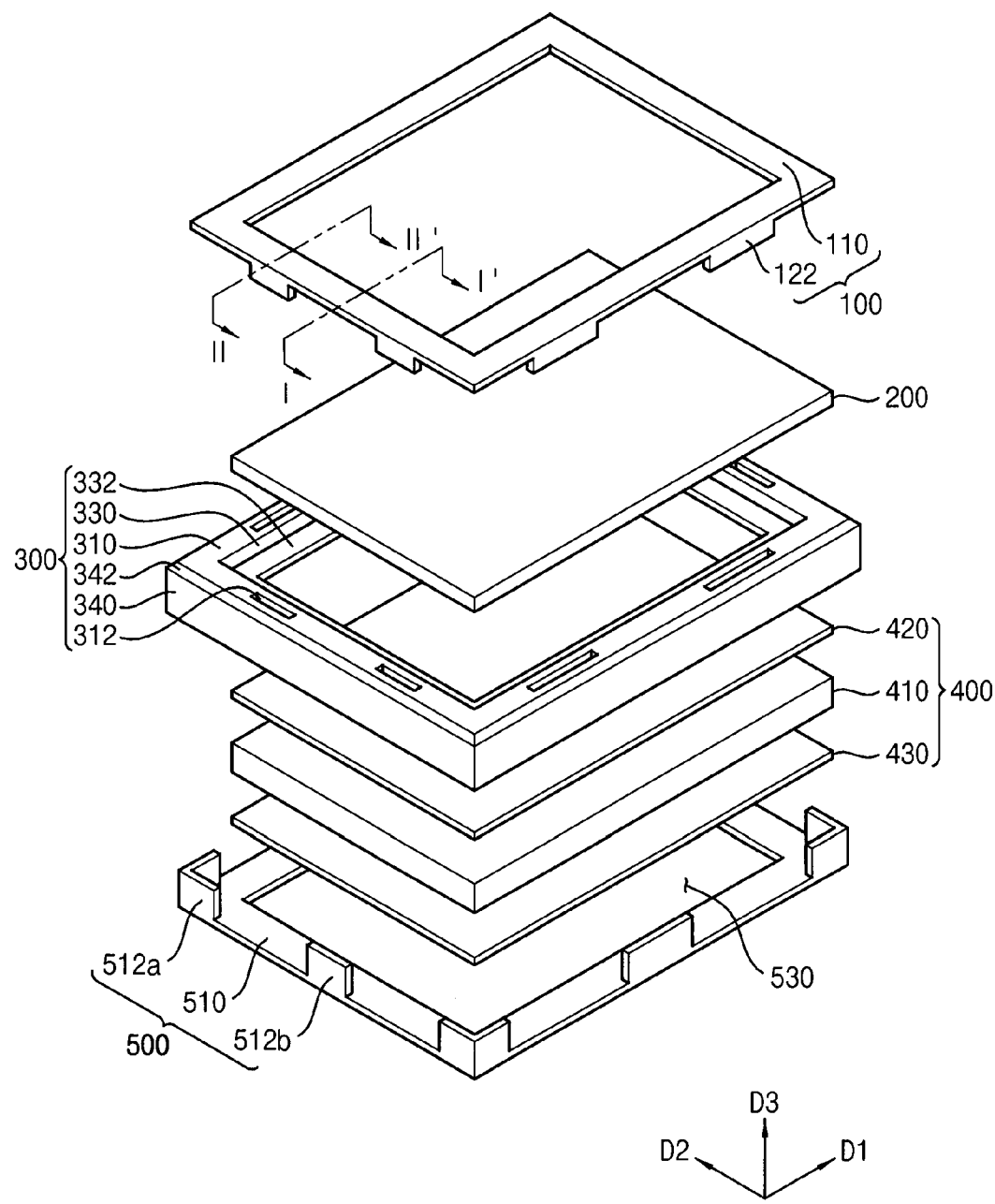
FIG. 7 is an exploded perspective view illustrating an exemplary embodiment of a display apparatus according to the invention.
Figure 8:
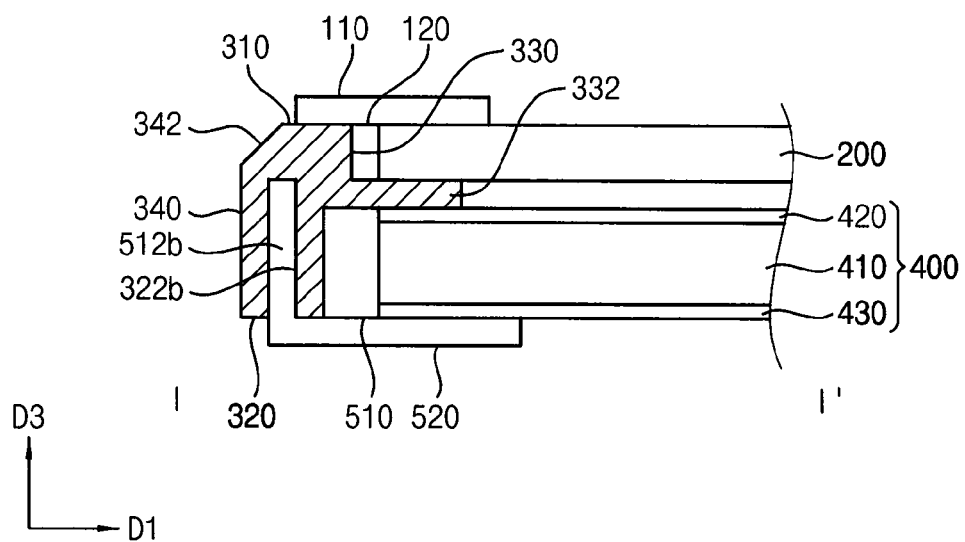
FIG. 8 is a cross-sectional view taken along line I-I' of FIG. 7.
Figure 9:
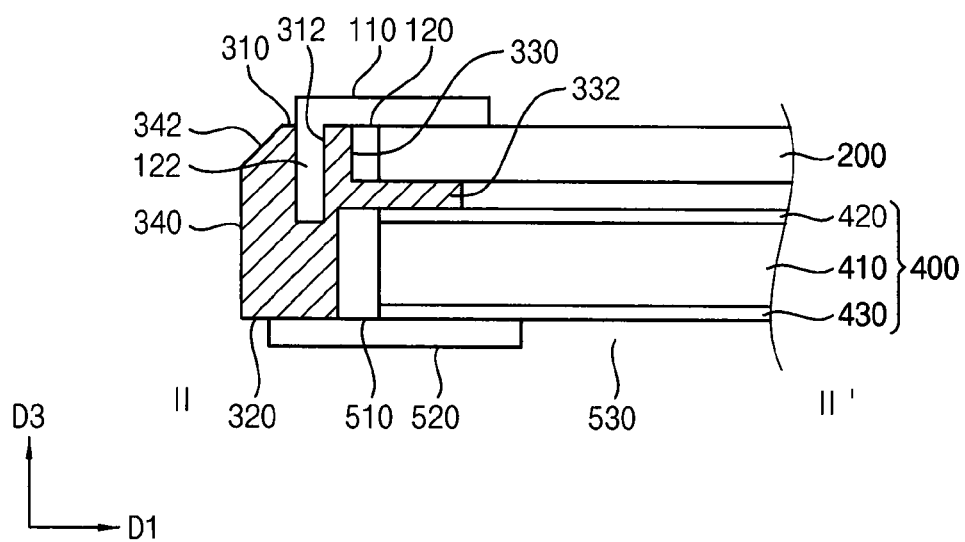
FIG. 9 is a cross-sectional view taken along line II-II' of FIG. 7.

FIG. 7 is an exploded perspective view illustrating a display apparatus according to an exemplary embodiment of the invention. FIG. 8 is a cross-sectional view taken along line I-I' of FIG. 7. FIG. 9 is a cross-sectional view taken along line II-II' of FIG. 7.

Referring to FIGS. 7 to 9, a display apparatus is substantially same as a display apparatus of FIGS. 4 to 5, except for a receiving container. Thus, any further detailed descriptions concerning the same elements will be briefly described or omitted.

The display apparatus includes a receiving container, a display panel 200 and a backlight unit 400. The receiving container includes a top cover 100, a bottom cover 500 and a mold frame 300. The receiving container receives the display panel 200 and the backlight unit 400.

The top cover 100 extends in a first direction D1 and a second direction D2. An opening is defined at a central portion of the top cover 100. The top cover 100 includes a top cover upper surface 110 and a top cover lower surface 120 which is opposite to the top cover upper surface 110. A plurality of top cover protrusions 122 is provided on the top cover lower surface 120. The top cover protrusion 122 extends in a third direction D3 which is substantially perpendicular to the first and second directions D1 and D2. The top cover protrusion 122 is received in a top cover combining groove of the mold frame 300, which will be mentioned later.

The top cover protrusions 122 are spaced apart from each other. In a plan view, a first or second bottom cover protrusion, which will be mentioned later, is disposed between the two top cover protrusions 122 which are disposed adjacent to each other. Thus, the top cover protrusion 122 may have a sufficiently extended length along the third direction D3. In an exemplary embodiment, the top cover protrusion 122 may have a length greater than a half of thickness of the mold frame, for example.

In an exemplary embodiment, the top cover 100 may include a material having good impact resistance, such as plastic. In an exemplary embodiment, the top cover 100 may include polycarbonate and glass fiber, for example. In an exemplary embodiment, the top cover 100 may include a material same as that of the mold frame 300. In an exemplary embodiment, the top cover 100 may be provided by an injection molding method, for example.

The display panel 200 is received in between the mold frame 300 and the top cover 100.

The display panel 200 displays an image using light generated from the backlight unit 400 according to driving and data signal applied from outside. In an exemplary embodiment, the display panel 200 includes an array substrate, an opposite substrate and a liquid crystal layer disposed between the array substrate and the opposite substrate.

The mold frame 300 is disposed between the top cover 100 and the bottom cover 500. The mold frame 300 receives and protects the display panel 200 and the backlight unit 400.

The mold frame 300 extends in the first direction D1 and the second direction D2. An opening is defined in the middle of the mold frame 300, so that light generated from the backlight unit 400 may reach to the display panel 200.

The mold frame 300 includes a mold frame upper surface 310, a mold frame lower surface 320 which is opposite to the mold frame upper surface 310, a mold frame inner surface 330 which connects the mold frame upper surface 310 and the mold frame lower surface 320 and defines the opening, a mold frame outer surface 340 which is opposite to the mold frame inner surface 330 and exposed to outside of the display apparatus, and a mold frame inclined surface 342 which connects the mold frame outer surface 340 to the mold frame upper surface 310. Thus, the mold frame 300 surrounds the display panel 200 and the backlight unit 400. A display panel supporting portion 332 is protruded from the mold frame inner surface 330.

A first top cover combining groove is defined in the mold frame upper surface 310. The top cover combining groove 312 receives the top cover protrusion 122 of the top cover 100, so that the top cover 100 and the mold frame 300 may be combined together. The top cover protrusion 122 and the top cover combining groove 312 may be combined with each other in interference fit manner. In an exemplary embodiment, the top cover combining groove 312 may have a depth greater than a half of thickness of the mold frame 300 in the third direction D3, for example.

A first bottom cover combining groove and a second bottom cover combining groove 322b are defined in the mold frame lower surface 320. The first bottom cover combining groove and the second bottom cover combining groove 322b respectively receive first and second bottom cover protrusions 512a and 512b, which will be mentioned later, so that the bottom cover 500 and the mold frame 300 may be combined with each other. The first and second bottom cover protrusions and the first bottom cover combining groove and second bottom cover combining groove and 322b may be respectively combined with each other in interference fit manner. Each of the first bottom cover combining groove and the second bottom cover combining groove 322b may have a depth greater than a half of thickness of the mold frame 300 in the third direction D3.

In an exemplary embodiment, the mold frame 300 may include a material having good impact resistance, such as plastic. In an exemplary embodiment, the mold frame 300 may include polycarbonate and glass fiber, for example. In an exemplary embodiment, the mold frame 300 may be provided by an injection molding method, for example.

The backlight unit 400 is disposed under the display panel 200 to supply a light to the display panel 200.

The backlight unit 400 includes a light guiding plate 410, an optical element 420, a reflecting plate 430 and a light source (not shown).

The bottom cover 500 is disposed under the mold frame 300. The bottom cover 500 may be combined with the mold frame 300 to receive the backlight unit 400.

The bottom cover 500 extends in the first direction D1 and the second direction D2. An opening 530 exposing the reflecting plate 430 is defined at the middle of the bottom cover 500.

The bottom cover 500 includes a bottom cover upper surface 510 and a bottom cover lower surface 520 which is opposite to the bottom cover upper surface 510. A first bottom cover protrusion 512a and a second bottom cover protrusion 512b are provided on the bottom cover upper surface 510. Thus, the first and second bottom cover protrusions 512a and 512b extend in the third direction D3. The first and second bottom cover protrusions 512a and 512b are respectively received in the first bottom cover combining groove and the second bottom cover combining groove 322b of the mold frame 300, respectively, so that the bottom cover 500 and the mold frame 300 may be combined with each other.

The first bottom cover protrusions 512a is provided at an edge of the bottom cover 500, and may have L-shape corresponding to the edge of the bottom cover 500 in a plan view.

In an exemplary embodiment, the bottom cover 500 may include a material having good impact resistance, such as plastic. In an exemplary embodiment, the bottom cover 500 may include polycarbonate and glass fiber, for example. In an exemplary embodiment, the bottom cover 500 may include a same material as that of the mold frame 300, for example. Thus, the top cover 100, the mold frame 300 and the bottom cover 500 may include same material. In an exemplary embodiment, the bottom cover 500 may be provided by an injection molding method, for example.

According to the exemplary embodiment, in a plan view, the top cover protrusion 122 of the top cover 100 is spaced apart from the first and second bottom cover protrusions 512a and 512b of the bottom cover 500, so that each of the top cover protrusion 122 and the first and second bottom cover protrusions 512a and 512b may have a length greater than a half of thickness of the mold frame 300 in the third direction D3. Thus, the top cover 100, the mold frame 300 and the bottom cover 500 may be firmly fixed.

Figure 10:
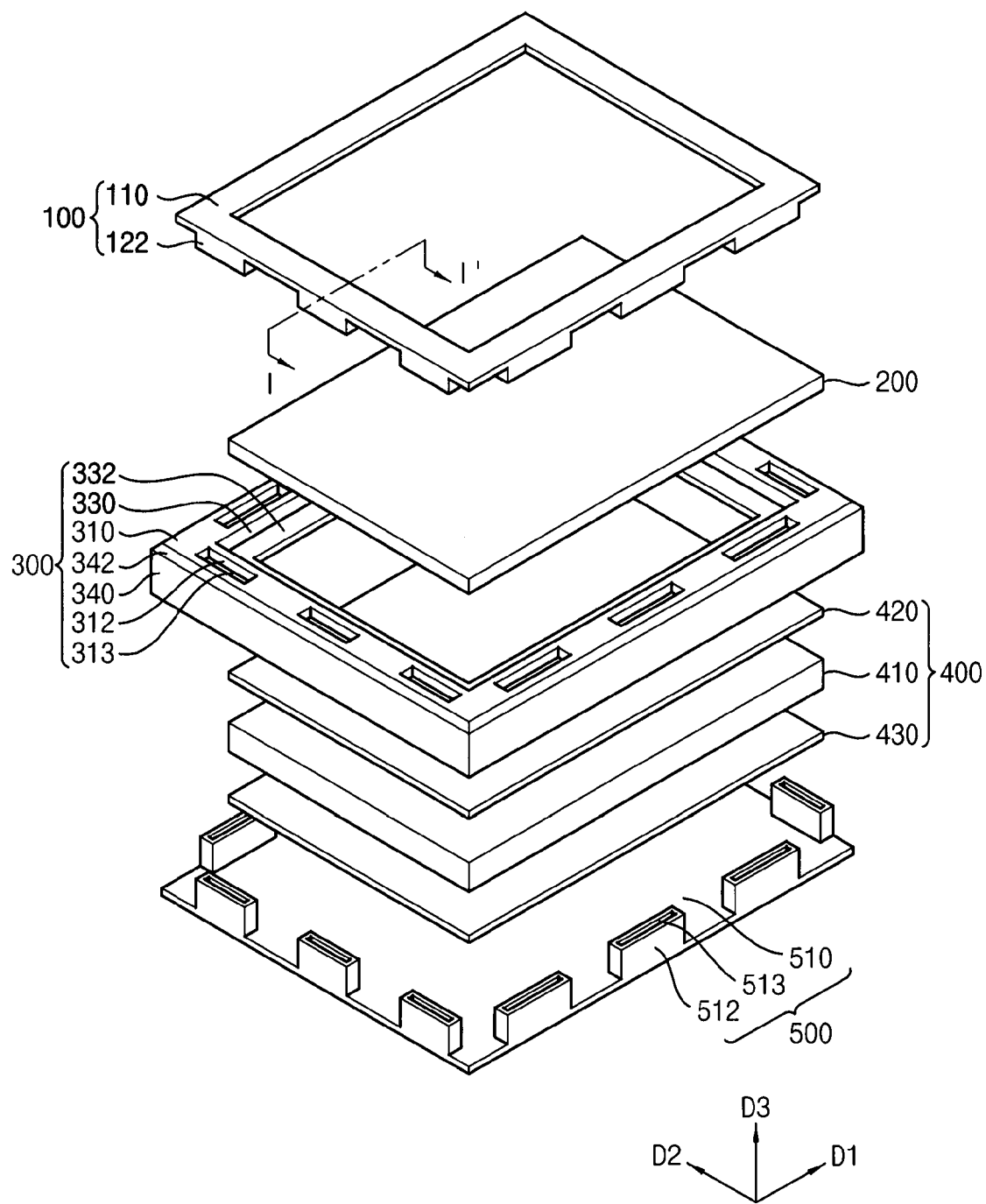
FIG. 10 is an exploded perspective view illustrating an exemplary embodiment of a display apparatus according to the invention.
Figure 11:
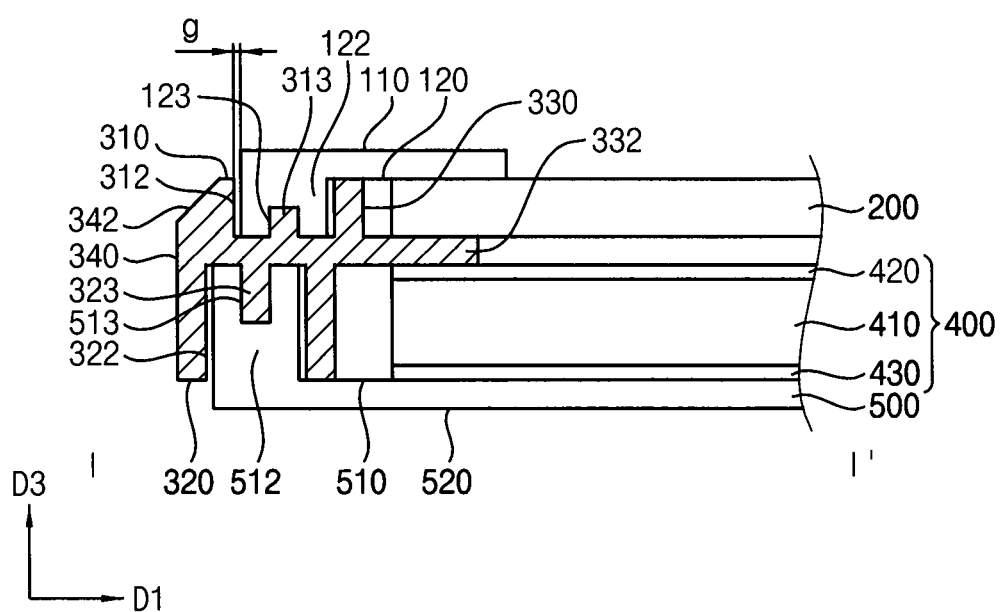
FIG. 11 is a cross-sectional view taken along line I-I' of FIG. 10.

FIG. 10 is an exploded perspective view illustrating a display apparatus according to an exemplary embodiment of the invention. FIG. 11 is a cross-sectional view taken along line I-I' of FIG. 10.

Referring to FIGS. 10 and 11, a display apparatus is substantially same as a display apparatus of FIGS. 1 to 3, except for a receiving container. Thus, any further detailed descriptions concerning the same elements will be briefly described or omitted.

The display apparatus includes a receiving container, a display panel 200 and a backlight unit 400. The receiving container includes a top cover, a bottom cover and a mold frame 300. The receiving container receives the display panel 200 and the backlight unit 400.

The top cover 100 extends in a first direction D1 and a second direction D2. An opening is defined at a central portion of the top cover 100. The top cover 100 includes a top cover upper surface 110 and a top cover lower surface 120 which is opposite to the top cover upper surface 110. A top cover protrusion 122 is provided on the top cover lower surface 120. Thus, the top cover protrusion 122 extends in a third direction D3. The third direction D3 is substantially perpendicular to the first and second directions D1 and D2. A first groove 123 is defined in the top cover protrusion 122. The top cover protrusion 122 may be received in a top cover combining groove of the mold frame 300, which will be mentioned later. The first groove 123 may be combined with a first protrusion of a top cover combining groove of the mold frame 30, which will be mentioned later.

The top cover 100 may include a material having good impact resistance, such as plastic. In an exemplary embodiment, the top cover 100 may include polycarbonate and glass fiber. In addition, the top cover 100 may include a material same as that of the mold frame 300. The top cover 100 may be provided by an injection molding method.

The display panel 200 is received in between the mold frame 300 and the top cover 100.

The display panel 200 displays an image using light generated from the backlight unit 400 according to driving and data signal applied from outside. In an exemplary embodiment, the display panel 200 includes an array substrate, an opposite substrate and a liquid crystal layer disposed between the array substrate and the opposite substrate.

The mold frame 300 is disposed between the top cover 100 and the bottom cover 500. The mold frame 300 receives and protects the display panel 200 and the backlight unit 400.

The mold frame 300 extends in the first direction D1 and the second direction D2. An opening is defined in the middle of the mold frame 300, so that light generated from the backlight unit 400 may reach to the display panel 200.

The mold frame 300 includes a mold frame upper surface 310, a mold frame lower surface 320 which is opposite to the mold frame upper surface 310, a mold frame inner surface 330 which connects the mold frame upper surface 310 and the mold frame lower surface 320 and defines the opening, and a mold frame outer surface 340 which is opposite to the mold frame inner surface 330 and exposed to outside of the display apparatus. Thus, the mold frame 300 surrounds the display panel 200 and the backlight unit 400. A display panel supporting portion 332 is protruded from the mold frame inner surface 330.

A top cover combining groove 312 is provided on the mold frame upper surface 310. The top cover combining groove 312 receives the top cover protrusion 122 of the top cover 100. A side surface of the top cover protrusion 122 and a side surface of the top cover combining groove 312 may be spaced apart from each other by a predetermined distance g. The side surface of the top cover protrusion 122 extends in a third direction D3 which is substantially perpendicular to the first and second directions D1 and D2. A first protrusion 313 which extends in the third direction D3 is provided in the top cover combining groove 312. The first protrusion 313 receives in the first groove 123. The first protrusion 313 and the first groove 123 may be combined with each other in interference fit manner.

A bottom cover combining groove 322 is defined in the mold frame lower surface 320. The bottom cover combining groove 322 receives a bottom cover protrusion 512 of the bottom cover 500, which will be mentioned later. A side surface of the bottom cover protrusion 512 which extends in the third direction D3 may be spaced apart from a side surface of the bottom cover combining groove 322. A second protrusion 323 which is protruded in the third direction D3 is provided in the bottom cover combining groove 322. The second protrusion 323 is received in a second groove 513 of the bottom cover protrusion 512 of the bottom cover 500. The second protrusion 323 and the second groove 513 may be combined with each other in interference fit manner.

In an exemplary embodiment, the mold frame 300 may include a material having good impact resistance, such as plastic. In an exemplary embodiment, the mold frame 300 may include polycarbonate and glass fiber, for example. In an exemplary embodiment, the mold frame 300 may be provided by an injection molding method, for example.

The backlight unit 400 is disposed under the display panel 200 to supply a light to the display panel 200.

The backlight unit 400 includes a light guiding plate 410, an optical element 420, a reflecting plate 430 and a light source (not shown).

The bottom cover 500 is disposed under the mold frame 300. The bottom cover 500 may be combined with the mold frame 300 to receive the backlight unit 400.

The bottom cover 500 extends in the first direction D1 and the second direction D2. In an exemplary embodiment, an opening may be defined in the middle of the bottom cover 500 to expose the reflecting plate 430.

The bottom cover 500 includes a bottom cover upper surface 510 and a bottom cover lower surface 520 which is opposite to the bottom cover upper surface 510. A bottom cover protrusion 512 is provided on the bottom cover upper surface 510. Thus, the bottom cover protrusion 512 extends in the third direction D3. A second groove 513 is defined in the bottom cover protrusion 512. The bottom cover protrusion 512 is received in the bottom cover combining groove 322 of the mold frame 300. The second groove 513 is combined with the second protrusion 323 in the bottom cover combining groove 322 of the mold frame 300.

In an exemplary embodiment, the bottom cover 500 may include a material having good impact resistance, such as plastic. In an exemplary embodiment, the bottom cover 500 may include polycarbonate and glass fiber. In an exemplary embodiment, the bottom cover 500 may include a material substantially same as that of the mold frame 300. Thus, the top cover 100, the mold frame 300 and the bottom cover 500 may include the substantially same material. In an exemplary embodiment, the bottom cover 500 may be provided by an injection molding method, for example.

According to the exemplary embodiment, the first protrusion for combination of the mold frame and the top cover is provided in the top cover combining groove, so that damages on the top cover protrusion of the top cover and the first protrusion of the mold frame may be prevented during an assembly process of the display apparatus. Similarly, damages on the bottom cover protrusion of the bottom cover and the second protrusion of the mold frame may be prevented.

Figure 12:
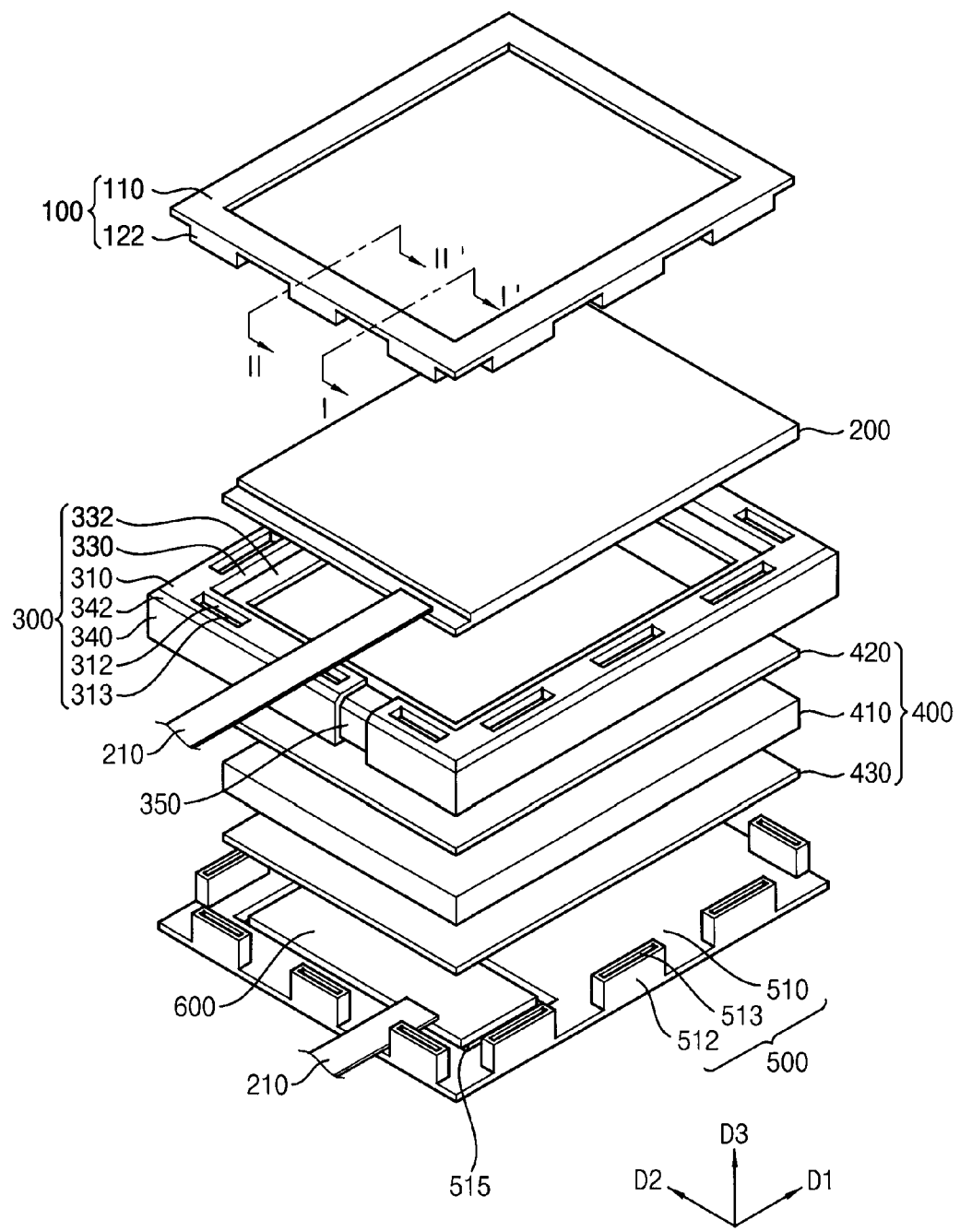
FIG. 12 is an exploded perspective view illustrating an exemplary embodiment of a display apparatus according to the invention.
Figure 13:
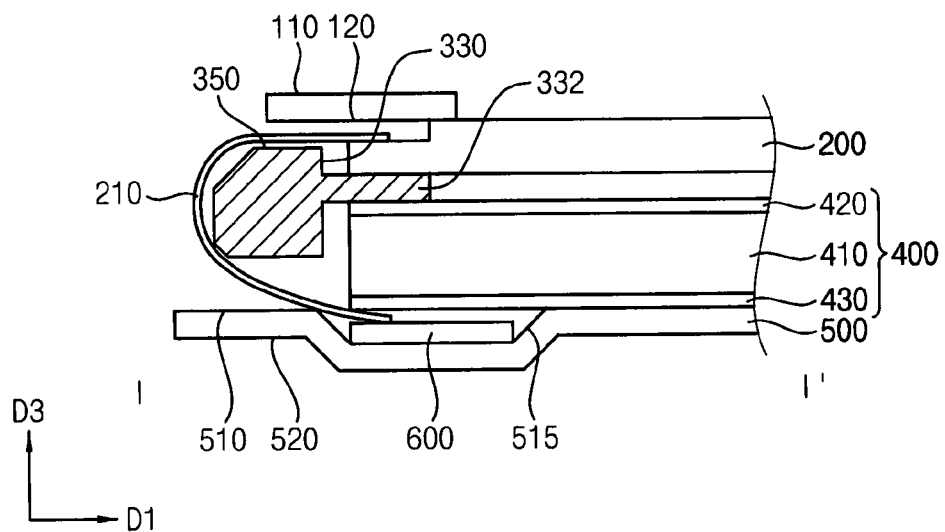
FIG. 13 is a cross-sectional view taken along line I-I' of FIG. 12.
Figure 14:
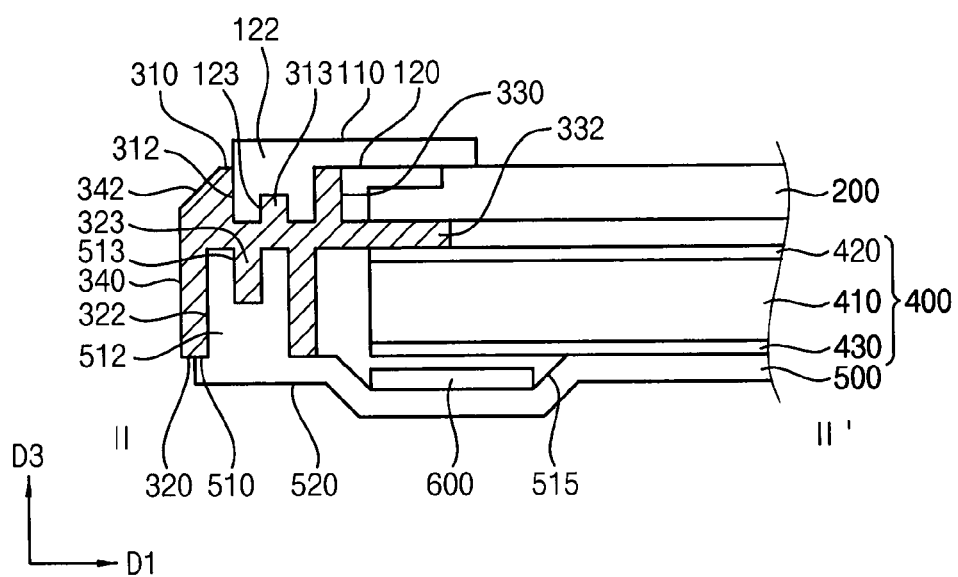
FIG. 14 is a cross-sectional view taken along line II-II' of FIG. 12.

FIG. 12 is an exploded perspective view illustrating a display apparatus according to an exemplary embodiment of the invention. FIG. 13 is a cross-sectional view taken along line I-I' of FIG. 12. FIG. 14 is a cross-sectional view taken along line II-II' of FIG. 12.

Referring to FIGS. 12 to 14, a display apparatus is substantially same as a display apparatus of FIGS. 10 and 11, except for a receiving container, a connecting part 210 and a driving part 600. Thus, any further detailed descriptions concerning the same elements will be briefly described or omitted.

The display apparatus includes a receiving container, a display panel 200, a backlight unit 400 and a driving part 600. The receiving container includes a top cover, a bottom cover and a mold frame 300. The receiving container receives the display panel 200, the backlight unit 400 and the driving part 600.

The top cover 100 includes top cover upper surface 110 and a top cover lower surface 120 which is opposite to the top cover upper surface 110. A top cover protrusion 122 is provided on the top cover lower surface 120. A first groove 123 is defined in the top cover protrusion 122.

In an exemplary embodiment, the top cover 100 may include a material having good impact resistance, such as plastic. In an exemplary embodiment, the top cover 100 may include polycarbonate and glass fiber, for example. In an exemplary embodiment, the top cover 100 may include a material same as that of the mold frame 300. In an exemplary embodiment, the top cover 100 may be provided by an injection molding method, for example.

The display panel 200 is received in between the mold frame 300 and the top cover 100.

The display panel 200 displays an image using light generated from the backlight unit 400 according to driving and data signal applied from outside. In an exemplary embodiment, the display panel 200 includes an array substrate, an opposite substrate and a liquid crystal layer disposed between the array substrate and the opposite substrate. The display panel 200 is electrically connected to the driving part 600 through the connecting part 210. In an exemplary embodiment, the connecting part 210 may be a flexible printed circuit board, for example.

The mold frame 300 is disposed between the top cover 100 and the bottom cover 500. The mold frame 300 receives and protects the display panel 200 and the backlight unit 400.

The mold frame 300 extends in the first direction D1 and the second direction D2. An opening is defined in the middle of the mold frame 300, so that light generated from the backlight unit 400 may reach to the display panel 200.

The mold frame 300 includes a mold frame upper surface 310, a mold frame lower surface 320 which is opposite to the mold frame upper surface 310, a mold frame inner surface 330 which connects the mold frame upper surface 310 and the mold frame lower surface 320 and defines the opening, a mold frame outer surface 340 which is opposite to the mold frame inner surface 330 and exposed to outside of the display apparatus, and a mold frame inclined surface 342 which connects the mold frame outer surface 340 to the mold frame upper surface 310. Thus, the mold frame 300 surrounds the display panel 200 and the backlight unit 400. A display panel supporting portion 332 is protruded from the mold frame inner surface 330.

A connecting part receiving groove 350 is defined in the mold frame upper surface 310, the mold frame inclined surface 342, the mold frame outer surface 340 and the mold frame lower surface 320. The connecting part receiving groove 350 receives the connecting part 210.

A top cover combining groove 312 is defined in the mold frame upper surface 310. The top cover combining groove 312 receives the top cover protrusion 122 of the top cover 100. The top cover protrusion 122 and the top cover combining groove 312 may be combined with each other in interference fit manner. A first protrusion 313 which extends in the third direction D3 is provided in the top cover combining groove 312. The first protrusion 313 receives in the first groove 123. The first protrusion 313 and the first groove 123 may be combined with each other in interference fit manner.

A bottom cover combining groove 322 is defined in the mold frame lower surface 320. The bottom cover combining groove 322 receives a bottom cover protrusion bottom cover protrusion of the bottom cover 500, which will be mentioned later. The bottom cover combining groove 322 and the bottom cover protrusion bottom cover protrusion may be combined with each other in interference fit manner. A second protrusion 323 which is protruded in the third direction D3 is provided in the bottom cover combining groove 322. The second protrusion 323 is received in a second groove 513 of the bottom cover protrusion 512 of the bottom cover 500, which will be mentioned later. The second protrusion 323 and the second groove 513 may be combined with each other in interference fit manner.

In an exemplary embodiment, the mold frame 300 may include a material having good impact resistance, such as plastic. In an exemplary embodiment, the mold frame 300 may include polycarbonate and glass fiber, for example. In an exemplary embodiment, the mold frame 300 may be provided by an injection molding method, for example.

The backlight unit 400 is disposed under the display panel 200 to supply a light to the display panel 200.

The backlight unit 400 includes a light guiding plate 410, an optical element 420, a reflecting plate 430 and a light source (not shown).

The bottom cover 500 is disposed under the mold frame 300. The bottom cover 500 may be combined with the mold frame 300 to receive the backlight unit 400.

The bottom cover 500 includes a bottom cover upper surface 510 and a bottom cover lower surface 520 which is opposite to the bottom cover upper surface 510. A bottom cover protrusion 512 is provided on the bottom cover upper surface 510. Thus, the bottom cover protrusion 512 extends in the third direction D3. A second groove 513 is defined in the bottom cover protrusion 512. The bottom cover protrusion 512 is received in the bottom cover combining groove 322 of the mold frame 300. The second groove 513 is combined with the first protrusion 323 in the bottom cover combining groove 322 of the mold frame 300.

A driving part receiving recess 515 is defined in the bottom cover upper surface 510. The driving part 600 is disposed in the driving part receiving recess 515.

In an exemplary embodiment, the bottom cover 500 may include a material having good impact resistance, such as plastic. In an exemplary embodiment, the bottom cover 500 may include polycarbonate and glass fiber, for example. In an exemplary embodiment, the bottom cover 500 may include a material same as that of the mold frame 300. Thus, the top cover 100, the mold frame 300 and the bottom cover 500 may include same material. The bottom cover 500 may be provided by an injection molding method.

The driving part 600 is electrically connected to the display panel 200 through the connecting part 210. In an exemplary embodiment, the driving part 600 may be a printed circuit board, for example, and transmits signal for driving the display panel 200 to the display panel 200 through the connecting part 210.

Figure 15:
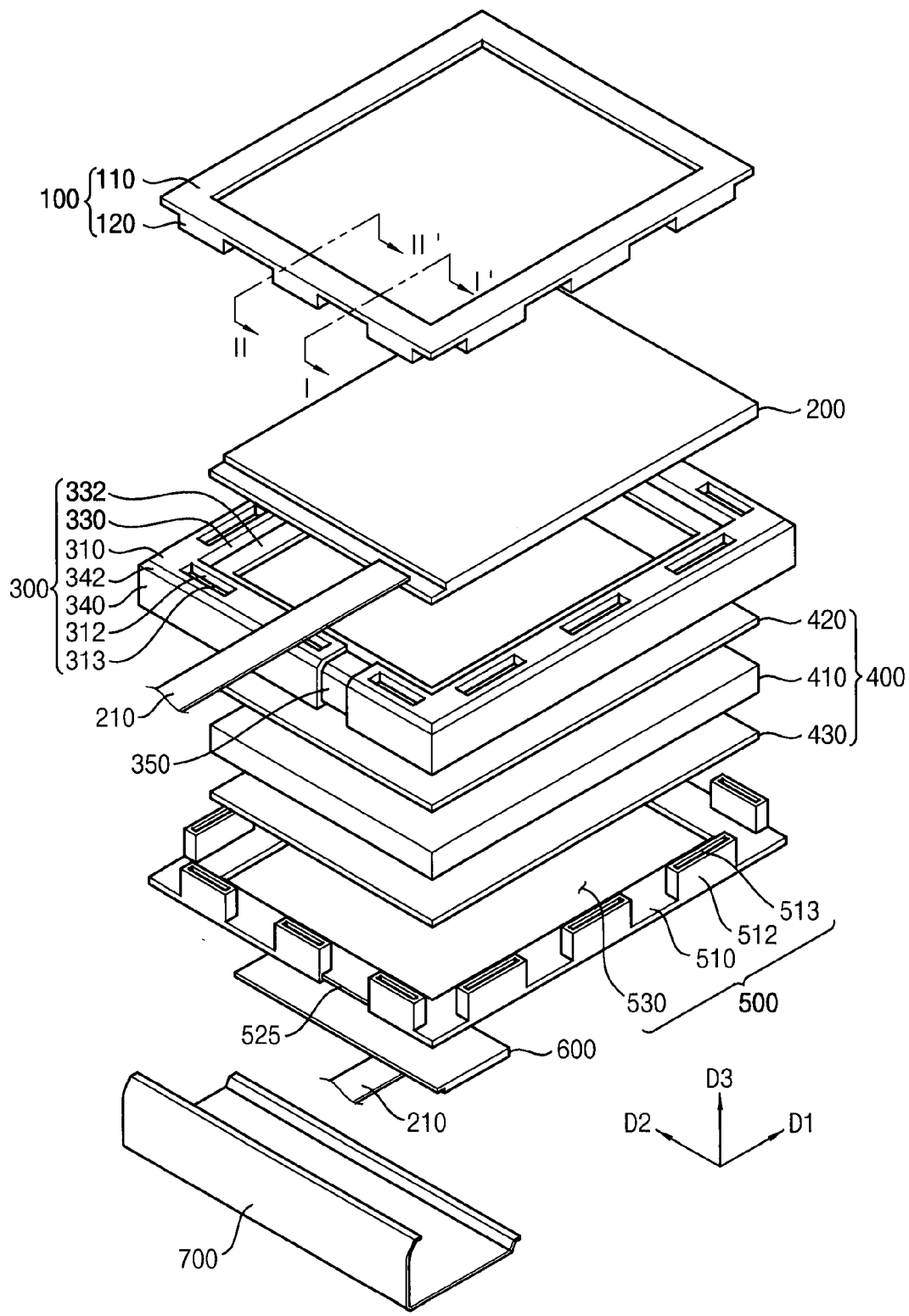
FIG. 15 is an exploded perspective view illustrating an exemplary embodiment of a display apparatus according to the invention.
Figure 16:
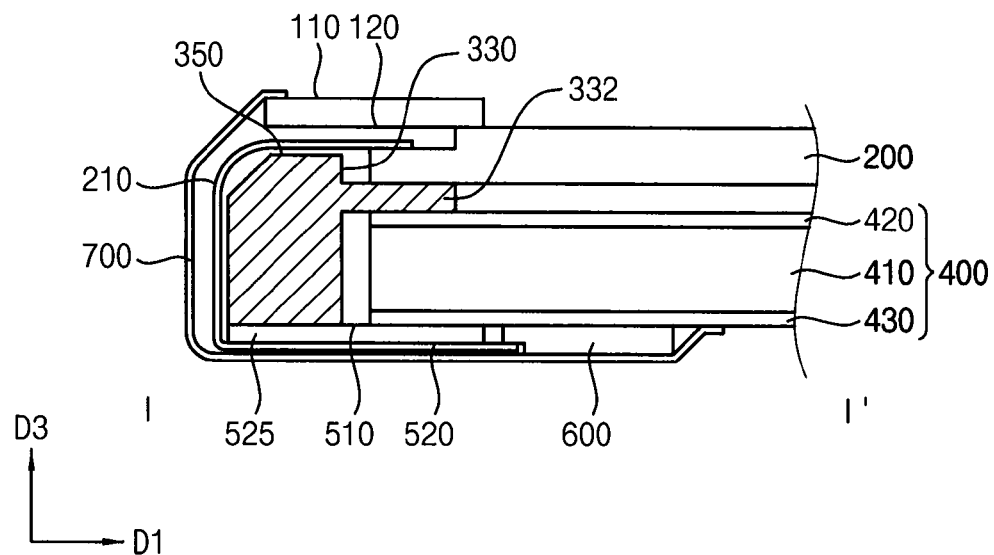
FIG. 16 is a cross-sectional view taken along line I-I' of FIG. 15.
Figure 17:
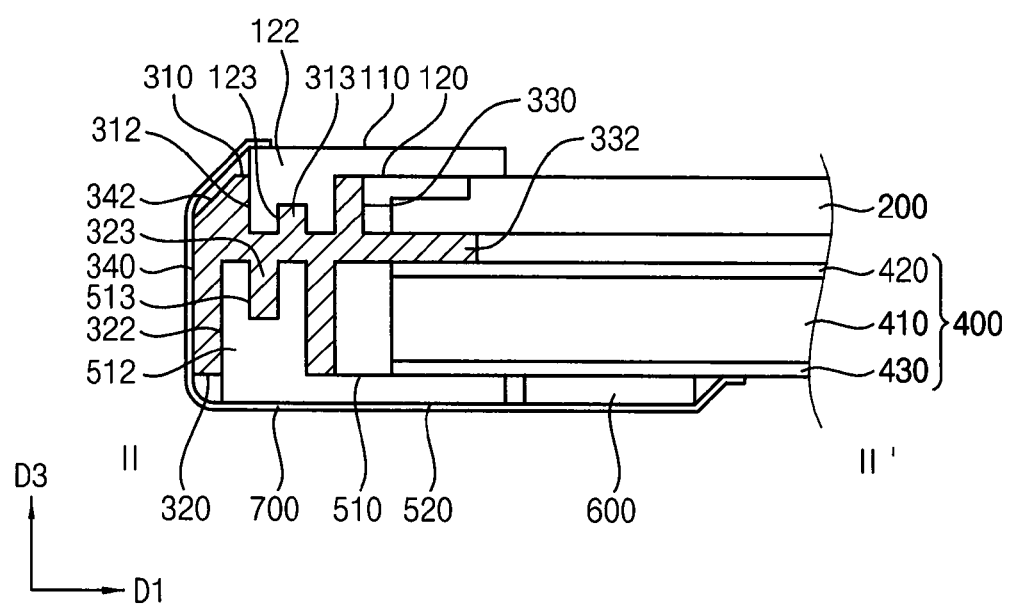
FIG. 17 is a cross-sectional view taken along line II-II' of FIG. 15.

FIG. 15 is an exploded perspective view illustrating a display apparatus according to an exemplary embodiment of the invention. FIG. 16 is a cross-sectional view taken along line I-I' of FIG. 15. FIG. 17 is a cross-sectional view taken along line II-II' of FIG. 15.

Referring to FIGS. 15 to 17, a display apparatus is substantially same as a display apparatus of FIGS. 10 to 11, except for a bottom cover 500 and a driving part cover 700. Thus, any further detailed descriptions concerning the same elements will be briefly described or omitted.

The display apparatus includes a receiving container, a display panel 200, a backlight unit 400 and a driving part 600. The receiving container includes a top cover 100, a bottom cover 500 and a mold frame 300. The receiving container receives the display panel 200, the backlight unit 400 and the driving part 600.

The top cover 100 includes top cover upper surface 110 and a top cover lower surface 120 which is opposite to the top cover upper surface 110. A top cover protrusion 122 is provided on the top cover lower surface 120. A first groove 123 is defined in the top cover protrusion 122.

In an exemplary embodiment, the top cover 100 may include a material having good impact resistance, such as plastic. In an exemplary embodiment, the top cover 100 may include polycarbonate and glass fiber, for example. In an exemplary embodiment, the top cover 100 may include a material same as that of the mold frame 300. In an exemplary embodiment, the top cover 100 may be provided by an injection molding method, for example.

The display panel 200 is received in between the mold frame 300 and the top cover 100.

The display panel 200 displays an image using light generated from the backlight unit 400 according to driving and data signal applied from outside. In an exemplary embodiment, the display panel 200 includes an array substrate, an opposite substrate and a liquid crystal layer disposed between the array substrate and the opposite substrate. The display panel 200 is electrically connected to the driving part 600 through the connecting part 210. In an exemplary embodiment, the connecting part 210 may be a flexible printed circuit board, for example.

The mold frame 300 is disposed between the top cover 100 and the bottom cover 500. The mold frame 300 receives and protects the display panel 200 and the backlight unit 400.

The mold frame 300 extends in the first direction D1 and the second direction D2. An opening is defined in the middle of the mold frame 300, so that light generated from the backlight unit 400 may reach to the display panel 200.

The mold frame 300 includes a mold frame upper surface 310, a mold frame lower surface 320 which is opposite to the mold frame upper surface 310, a mold frame inner surface 330 which connects the mold frame upper surface 310 and the mold frame lower surface 320 and defines the opening, a mold frame outer surface 340 which is opposite to the mold frame inner surface 330 and exposed to outside of the display apparatus, and a mold frame inclined surface 342 which connects the mold frame outer surface 340 to the mold frame upper surface 310. Thus, the mold frame 300 surrounds the display panel 200 and the backlight unit 400. A display panel supporting portion 332 is protruded from the mold frame inner surface 330.

A connecting part receiving groove 350 is defined in the mold frame upper surface 310, the mold frame inclined surface 342 and the mold frame outer surface 340. The connecting part receiving groove 350 receives the connecting part 210.

A top cover combining groove 312 is defined in the mold frame upper surface 310. The top cover combining groove 312 receives the top cover protrusion 122 of the top cover 100. A first protrusion 313 which extends in the third direction D3 is provided in the top cover combining groove 312. The first protrusion 313 receives in the first groove 123.

A bottom cover combining groove 322 is provided on the mold frame lower surface 320. The bottom cover combining groove 322 receives a bottom cover protrusion 512 of the bottom cover 500, which will be mentioned later. A second protrusion 323 which is protruded in the third direction D3 is provided in the bottom cover combining groove 322. The second protrusion 323 is received in a second groove 513 of the bottom cover protrusion of the bottom cover 500, which will be mentioned later.

In an exemplary embodiment, the mold frame 300 may include a material having good impact resistance, such as plastic. In an exemplary embodiment, the mold frame 300 may include polycarbonate and glass fiber, for example. In an exemplary embodiment, the mold frame 300 may be provided by an injection molding method, for example.

The backlight unit 400 is disposed under the display panel 200 to supply a light to the display panel 200.

The backlight unit 400 includes a light guiding plate 410, an optical element 420, a reflecting plate 430 and a light source (not shown).

The bottom cover 500 is disposed under the mold frame 300. The bottom cover 500 may be combined with the mold frame 300 to receive the backlight unit 400.

The bottom cover 500 extends in the first direction D1 and the second direction D2. An opening 530 is defined in the middle of the bottom cover 500 to expose the reflecting plate 430.

The bottom cover 500 includes a bottom cover upper surface 510 and a bottom cover lower surface 520 which is opposite to the bottom cover upper surface 510. A bottom cover protrusion 512 is provided on the bottom cover upper surface 510. A second groove 513 is defined in the bottom cover protrusion 512. The bottom cover protrusion 512 is received in the bottom cover combining groove 322 of the mold frame 300. The second groove 513 is combined with the first protrusion 323 in the bottom cover combining groove 322 of the mold frame 300.

A connecting part receiving groove 515 is defined in the bottom cover lower surface 520 and an outer surface of the bottom cover 500. The connecting part 210 may be received in the connecting part receiving groove 525. Accordingly, the connecting part 210 is received in the connecting part receiving groove 350 of the mold frame 300 and the connecting part receiving groove 525 of the bottom cover 500, so that the connecting part 210 may extend from the display panel 200 to the driving part 600.

The driving part 600 is received in the opening 530 of the bottom cover 500. The driving part 600 is electrically connected to the display panel 200 through the connecting part 210. In an exemplary embodiment, the driving part 600 may be a printed circuit board, for example, and transmits signal for driving the display panel 200 to the display panel 200 through the connecting part 210.

The driving part cover 700 covers the driving part 600 and the connecting part 210 to protect them. In an exemplary embodiment, the driving part cover 700 may be attached on a portion of the top cover upper surface 110 of the top cover 100, a portion of the mold frame outer surface 340 of the mold frame 300 and a portion of the bottom cover lower surface 520 of the bottom cover 500.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display apparatus comprising:
   a display panel configured to display an image;
   a backlight unit which is disposed under the display panel and configured to provide a light to the display panel;
   a mold frame which surrounds the display panel and the backlight unit, in which a plurality of top cover combining grooves and a plurality of bottom cover combining grooves are defined;
   a top cover comprising a plurality of top cover protrusions which are protruded from the top cover and received in the top cover combining grooves of the mold frame; and
   a bottom cover comprising a plurality of bottom cover protrusion which are protruded from the bottom cover, and received in the bottom cover combining grooves of the mold frame,
   wherein a plurality of weight reduction grooves are further defined in the mold frame, and
   the weight reduction grooves and the top cover combining grooves are alternately formed along edges of a same mold frame upper surface of the mold frame covered by the top cover.

2. The display apparatus of claim 1, wherein
   the top cover further comprises a top cover upper surface, and a top cover lower surface which is opposite to the top cover upper surface, and
   the top cover protrusion of the top cover is disposed on an outmost portion of the top cover lower surface.

3. The display apparatus of claim 2, wherein
   the mold frame comprises the mold frame upper surface, a mold frame lower surface which is opposite to the mold frame upper surface, a mold frame inner surface which connects the mold frame upper surface and the mold frame lower surface, and a mold frame outer surface which is opposite to the mold frame inner surface,
   the top cover lower surface of the top cover contacts the mold frame upper surface of the mold frame,
   the bottom cover further comprises a bottom cover upper surface on which a bottom cover protrusion is protruded and a bottom cover lower surface which is opposite to the bottom cover upper surface, and the bottom cover upper surface of the bottom cover contacts the mold frame lower surface of the mold frame.

4. The display apparatus of claim 3, wherein
the top cover protrusion comprises a first top cover protrusion, and a second top cover protrusion which is spaced apart from the first top cover protrusion, and
the first top cover protrusion has L-shape corresponding to an edge of the top cover.

5. The display apparatus of claim 3, wherein
the mold frame further comprises a mold frame inclined surface which connects the mold frame outer surface to the mold frame upper surface, and
the mold frame inclined surface is inclined with respect to the mold frame outer surface by a predetermined angle.

6. The display apparatus of claim 1, wherein the weight reduction groove of the mold frame has a substantially same shape as that of the top cover combining groove.

7. The display apparatus of claim 1, wherein the top cover combining groove of the mold frame is spaced apart from the bottom cover combining groove in a plan view.

8. The display apparatus of claim 7, wherein
a depth of the top cover combining groove of the mold frame is greater than about a half of a thickness of the mold frame, and
a depth of the bottom cover combining groove of the mold frame is greater than about half of the thickness of the mold frame.

9. The display apparatus of claim 1, wherein an opening which exposes the backlight unit is defined through the bottom cover.

10. The display apparatus of claim 9, wherein the bottom cover comprises:
a first bottom cover portion extending in a first direction;
a second bottom cover portion spaced apart from the first bottom cover portion in a second direction, which is substantially perpendicular to the first direction, and extending in the first direction;
a third bottom cover portion connecting the first bottom cover portion to the second bottom cover portion, and extending in the second direction; and
a fourth bottom cover portion connecting the first bottom cover portion to the second bottom cover portion, spaced apart from the third bottom cover portion, and extending in the second direction, and
wherein the first to fourth bottom cover portions are physically distinct from each other.

11. The display apparatus of claim 1, wherein the top cover further comprises:
a first top cover portion extending in a first direction;
a second top cover portion spaced apart from the first top cover portion in a second direction, which is substantially perpendicular to the first direction, and extending in the first direction;
a third top cover portion connecting first top cover portion to the second top cover portion, and extending in the second direction; and
a fourth top cover portion connecting the first top cover portion to the second top cover portion, spaced apart from the third top cover portion, and extending in the second direction, and
wherein the first to fourth top covers are physically distinct from each other.

12. The display apparatus of claim 1, wherein the top cover protrusion of the top cover is larger than the top cover combining groove of the mold frame and is combined with the top cover combining groove of the mold frame in an interference fit manner.

13. The display apparatus of claim 1, wherein
a first groove is defined in the top cover protrusion, a first protrusion of the top cover is protruded into the top cover combining groove of the mold frame, and
the first protrusion of the top cover is received in the first groove.

14. The display apparatus of claim 13, wherein a side surface of the top cover protrusion is spaced apart from a side surface of the top cover combining groove by a predetermined distance.

15. The display apparatus of claim 14, wherein the first protrusion is larger than the first groove and is combined with the first groove in an interference fit manner.

16. The display apparatus of claim 1, further comprising:
a connecting part electrically connected to the display panel; and
a driving part configured to generate a signal for driving the display panel, and electrically connected to the display panel through the connecting part.

17. The display apparatus of claim 16, wherein a connecting part receiving groove which receives the connecting part is defined in the mold frame.

18. The display apparatus of claim 17, further comprising a driving cover configured to cover the driving part, wherein the driving part is disposed between the driving cover and the backlight unit.

* * * * *